United States Patent
Sotani et al.

(10) Patent No.: US 9,507,585 B2
(45) Date of Patent: Nov. 29, 2016

(54) FIRMWARE UPDATE APPARATUS AND STORAGE CONTROL APPARATUS

(71) Applicant: FUJITSU LIMITED, Kawasaki-shi, Kanagawa (JP)

(72) Inventors: Motoki Sotani, Fuchu (JP); Tadashi Matsumura, Kawasaki (JP); Noriyuki Yasu, Kawasaki (JP); Tomohiko Muroyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/692,837

(22) Filed: Apr. 22, 2015

(65) Prior Publication Data

US 2015/0347124 A1    Dec. 3, 2015

(30) Foreign Application Priority Data

May 28, 2014    (JP) .................................. 2014-110090

(51) Int. Cl.
G06F 9/44    (2006.01)
G06F 9/445    (2006.01)

(52) U.S. Cl.
CPC .......... *G06F 8/665* (2013.01); *G06F 9/44536* (2013.01)

(58) Field of Classification Search
None
See application file for complete search history.

(56) References Cited

U.S. PATENT DOCUMENTS

| 6,609,127 B1 * | 8/2003 | Lee | G06F 8/65 |
| 6,622,302 B1 * | 9/2003 | Delaney | G06F 8/65 717/168 |
| 2004/0199615 A1 * | 10/2004 | Philyaw | G06F 9/4411 709/220 |
| 2007/0055970 A1 * | 3/2007 | Sakuda | G06F 8/65 717/168 |
| 2007/0294684 A1 | 12/2007 | Kumashiro et al. | |
| 2010/0169876 A1 * | 7/2010 | Mann | G06F 8/65 717/170 |
| 2011/0185304 A1 * | 7/2011 | Conzola | G06F 3/0481 715/772 |
| 2011/0191456 A1 * | 8/2011 | Jain | H04L 69/24 709/223 |
| 2012/0198434 A1 * | 8/2012 | Dirstine | G06F 8/65 717/170 |
| 2012/0291021 A1 * | 11/2012 | Banerjee | G06F 8/665 717/173 |
| 2013/0152068 A1 * | 6/2013 | Crk | G06F 8/68 717/172 |
| 2014/0007071 A1 * | 1/2014 | Chang | G06F 8/665 717/170 |
| 2014/0075425 A1 * | 3/2014 | Stevenson | G06F 8/67 717/171 |
| 2014/0149973 A1 * | 5/2014 | Walter | G06F 8/665 717/170 |
| 2014/0189673 A1 * | 7/2014 | Stenfort | G06F 8/665 717/170 |
| 2014/0298310 A1 * | 10/2014 | Iijima | G06F 8/665 717/170 |

FOREIGN PATENT DOCUMENTS

| JP | 7-44393 | 2/1995 |
| JP | 2006-338217 | 12/2006 |
| JP | 2007-334636 | 12/2007 |

* cited by examiner

*Primary Examiner* — Chameli Das
(74) *Attorney, Agent, or Firm* — Fujitsu Patent Center

(57) ABSTRACT

A storage unit stores information on the compatibility between different versions of firmware used for controlling two redundant modules provided in a storage apparatus. Upon updating firmware of the modules from a first version to a second version incompatible with the first version, a computing unit applies, alternately to one of the modules, firmware of a version that is one of versions from the first version to the second version, that is compatible with firmware of a version currently applied to the other one of the modules, and that is more recent than the version currently applied to the other one of the modules, by referring to the information.

6 Claims, 16 Drawing Sheets

FIG. 7

FIRMWARE COMPATIBILITY TABLE 151

| GENERAL VERSION | MODULE-SPECIFIC VERSION | TOTAL COMPATIBILITY INDEX |
|---|---|---|
| V1 | A1, B1, C1 | X1 |
| V2 | A2, B1, C1 | X2 |
| V3 | A2, B2, C1 | X3 |
| ... | ... | ... |
| Va | A3, B3, C1 | Xa |
| Va1 | A3, B3, C2 | Xa1 |
| ... | ... | ... |
| Vb | A5, B3, C2 | Xb |
| Vb1 | A5, B4, C2 | Xb1 |
| ... | ... | ... |
| Vc | A6, B4, C2 | Xc |
| ... | ... | ... |

FIG. 9A

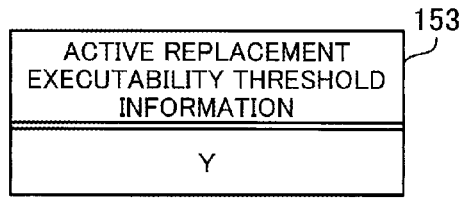

| ACTIVE REPLACEMENT EXECUTABILITY THRESHOLD INFORMATION |
|---|
| Y |

EXAMPLE OF DETERMINING COMPATIBILITY (1) $V1:X1=a1+b1+c1$ (2) $V2:X2=a2+b1+c1$ ---> $X2-X1 \leqq Y$ ⇒ ACTIVE REPLACEMENT POSSIBLE (COMPATIBLE)

⋮

(3) $Va:Xa=a3+b3+c1$ ---> $Xa-X1 \leqq Y$ ⇒ ACTIVE REPLACEMENT POSSIBLE (COMPATIBLE)

(4) $Va1:Xa1=a3+b3+c2$ ---> $Xa1-X1 > Y$ ⇒ ACTIVE REPLACEMENT NOT POSSIBLE (INCOMPATIBLE)

(5) $Va:Xa=a3+b3+c1$ (6) $Va1:Xa1=a3+b3+c2$ ---> $Xa1-Xa \leqq Y$ ⇒ ACTIVE REPLACEMENT POSSIBLE (COMPATIBLE)

⋮

(7) $Vb:Xb=a5+b3+c2$ ---> $Xb-Xa \leqq Y$ ⇒ ACTIVE REPLACEMENT POSSIBLE (COMPATIBLE)

FIG. 10

| INTERMEDIATE FIRMWARE TABLE | | | | 154 |
|---|---|---|---|---|
| APPLICATION ORDER | GENERAL VERSION | MODULE-SPECIFIC FIRMWARE PROGRAM | APPLICATION FLAG | |
| 1 | Va | A3, B3 | false | |
| 2 | Vb | A5, C2 | false | |

FIRMWARE UPDATE APPARATUS AND STORAGE CONTROL APPARATUS

CROSS-REFERENCE TO RELATED APPLICATION

This application is based upon and claims the benefit of priority of the prior Japanese Patent Application No. 2014-110090, filed on May 28, 2014, the entire contents of which are incorporated herein by reference.

FIELD

The embodiments discussed herein are related to a firmware update apparatus and a storage control apparatus.

BACKGROUND

Today, storage apparatuses are used for storing data. Such a storage apparatus includes multiple hard disk drives (HDDs) and solid state drives (SSDs) to provide a large storage space. The storage apparatus is provided with various types of modules having predetermined functions in the storage apparatus, such as controlling access to the storage space, controlling communication with other apparatuses, and so on. The modules often have a redundant configuration for each function in order to increase the fault tolerance of each function.

For controlling operations of the modules, software called firmware is used. Firmware is often upgraded for enhancing functions and applying modifications. In view of this, there has been proposed a method that updates firmware being used on an apparatus.

For example, there has been proposed a technique that provides two central processing units (CPUs) in a controller module of a storage apparatus, and performs active replacement of firmware in units of CPUs. This prevents disconnection of a path between the controller module and the host during the replacement.

There has also been proposed a technique that updates a control program in units of modules in electronic equipment that operates in accordance with the control program. The control program includes a plurality of sets of program data as modules which respectively perform task management, memory management, input and output control, and so on.

Further, there has been proposed a technique that compares update processing times of three types of update processes, namely, a full update process, a partial update process, and a copy-and-update process, and selects the fastest update process, when updating old version software to new version software.

See, for example, Japanese Laid-open Patent Publications No. 2006-338217; No. 7-44393; and No. 2007-334636.

By utilizing a redundant configuration of modules provided in a storage apparatus, firmware may be updated without stopping operations of the storage apparatus. More specifically, after writing new version firmware to a nonvolatile memory of each module, two systems having duplexed modules (two redundant modules) are sequentially rebooted one by one. When rebooted, each module loads the new version firmware to a volatile memory such as a random access memory (RAM) or the like provided in the module, and starts operating with the new version firmware. Even if the two modules operate with different versions of firmware, the two modules are able to appropriately cooperate with each other to maintain the redundant configuration as long as the different versions of firmware are compatible with each other.

However, in the case of updating firmware to a version (final update destination version) that is multiple versions apart from the current version, the current version is often incompatible with the final update destination version in terms of functions (for example, a function for controlling redundancy, and so on) provided by the firmware. After writing the firmware of the final update destination version to the two modules, if the method of sequentially rebooting two systems one by one is used, there will be a period during which one of the systems operates with the firmware of the final update destination version, and the other system operates with the firmware of the current version. If the functions provided by the firmware of the two systems are incompatible, the redundancy configuration of the two systems is lost, which might result in malfunction and a reduction in fault tolerance, for example. There may also be a method that sequentially updates the firmware of two systems one generation by one generation, for example. With this method, however, the number of times of replacing firmware is increased, which might increase the time taken to update the firmware.

SUMMARY

According to one aspect of the invention, there is provided a firmware update apparatus that includes: a memory that stores information on compatibility between different versions of firmware used for controlling two redundant modules provided in a storage apparatus; and a processor that performs a procedure including, upon updating firmware of the two modules from a first version to a second version incompatible with the first version, applying, alternately to one of the modules, firmware of a version that is one of versions from the first version to the second version, that is compatible with firmware of a version currently applied to the other one of the modules, and that is more recent than the version currently applied to the other one of the modules, by referring to the information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a firmware compatibility table according to the second embodiment;

FIGS. 9A and 9B illustrate an example of an active replacement executability threshold according to the second embodiment;

FIG. 10 illustrates an example of an intermediate firmware table according to the second embodiment;

DESCRIPTION OF EMBODIMENTS

Figure 1:
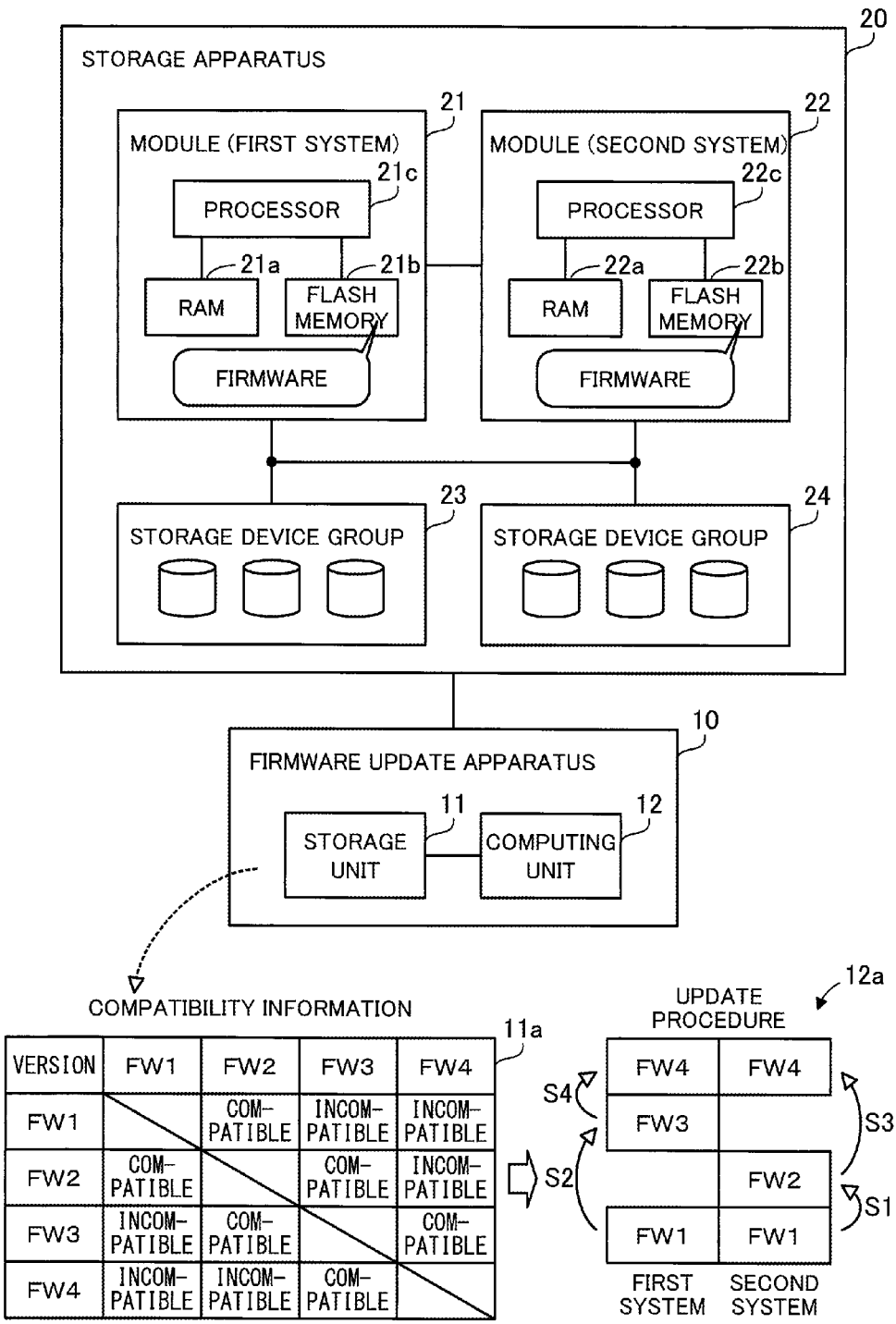
FIG. 1 illustrates a firmware update apparatus according to a first embodiment.

Several embodiments will be described below with reference to the accompanying drawings, wherein like reference numerals refer to like elements throughout.

(a) First Embodiment

FIG. 1 illustrates a firmware update apparatus 10 according to a first embodiment. The firmware update apparatus 10 controls update of firmware of a storage apparatus 20. The firmware is software used for controlling hardware modules of the storage apparatus 20. The firmware update apparatus 10 may be externally attached to the storage apparatus 20, or may be provided inside the storage apparatus 20. The firmware update apparatus 10 includes a storage unit 11 and a computing unit 12.

The storage unit 11 may be a volatile storage device such as RAM and the like, or may be a non-volatile storage device such as HDD, flash memory, and the like. The computing unit 12 may include a CPU, a digital signal processor (DSP), an application specific integrated circuit (ASIC), a field programmable gate array (FPGA), and the like. The computing unit 12 may be a processor that executes programs. The term "processor" as used herein also refers to a set of multiple processors (a multiprocessor).

The storage apparatus 20 includes modules 21 and 22, and storage device groups 23 and 24. The modules 21 and 22 are hardware modules that realize predetermined functions. For example, the modules 21 and 22 may be control modules that control the entire operations of the storage apparatus 20. The modules 21 and 22 may be communication modules that communicate with other apparatuses, connection modules that provide connection interfaces between a control module and the storage device groups 23 and 24, or the like.

The modules 21 and 22 cooperate with each other to realize a redundant configuration. For example, the modules 21 and 22 communicate with each other for alive monitoring. Thus, even if either one of the modules 21 and 22 fails, the other one of the modules 21 and 22 that has not failed stores a request issued to the failed module, and performs processing in response to the request, in place of the failed module. Redundancy control is implemented by the firmware executed on the modules 21 and 22. The module 21 may be referred to as a first system, and the module 22 may be referred to as a second system.

The module 21 includes a RAM 21a, a flash memory 21b, and a processor 21c. The RAM 21a is a volatile storage device that temporarily stores a firmware program to be executed by the processor 21c. The flash memory 21b is a non-volatile storage device that temporarily stores the firmware program. The processor 21c executes the firmware program.

The module 22 includes a RAM 22a, a flash memory 22b, and a processor 22c. The RAM 22a, the flash memory 22b, and the processor 22c correspond to the elements of the module 21 denoted by the same names. Each of the storage device groups 23 and 24 is a set of a plurality of HDDs, a set of a plurality of SSDs, or the like, and provides a storage space for storing user data. In normal operations, the processors 21c and 22c execute firmware of the same version. This is to appropriately perform cooperative operations such as redundancy control and so on by the modules 21 and 22.

Upon operating the storage apparatus 20, firmware of the current version is often updated to (replaced with) firmware of a new version. For example, the firmware is updated by the following procedure.

In the modules 21 and 22, firmware of a version V1 has been loaded in the RAMs 21a and 22a, and has been executed by the processors 21c and 22c (the firmware of the version V1 has been applied), before the firmware is updated. It is now assumed that the firmware of the version V1 in the modules 21 and 22 is updated to firmware of a version V2 which is compatible with the version V1 in terms of functions such as a redundancy control function and so on.

In this case, after writing the firmware of the version V2 to the flash memories 21b and 22b, the modules 21 and 22 need to be restarted in order to load the firmware of the version V2 to the RAMs 21a and 22a. However, if the modules 21 and 22 are restarted at the same time, it is not possible to access data in the storage device groups 23 and 24 during restart. Accordingly, the storage apparatus 20 restarts either one of the modules 21 and 22 first, and then restarts the other module.

Then, immediately after restarting either one of the modules, there will be a period during which the restarted module operates with the firmware of the version V2, while the other module that has not been restarted operates with the firmware of the version V1. That is, there will be a period during which the firmware of the version V2 is applied to the restarted module, and the firmware of the version V1 is applied to the module that has not been restarted. If the firmware of the version V1 and the firmware of the version V2 are compatible with each other, it is possible to perform cooperative operations such as redundancy control of the modules 21 and 22 even during this period. After that, the other module is restarted. Then, the other module also operates with the firmware of the version V2 (the firmware of the version V2 is applied to both the modules). In this way, the firmware is updated without suspending data access to the storage device groups 23 and 24. This way of updating firmware is often called active replacement of firmware.

Usually, if the difference in version is one generation, the compatibility of firmware is maintained. This is because it is not possible to perform active replacement of firmware unless the compatibility is maintained while allowing at least one generation difference in version. However, firmware is often upgraded to a version that is multiple generations apart (in other words, firmware is often updated to firmware that is two or more generations apart). In the case of upgrading firmware to a version that is multiple generations apart, the update source version is often incompatible with the update destination version. In view of this, the firmware update apparatus 10 controls update of firmware of the storage apparatus 20 in the following manner.

The storage unit 11 stores information 11a indicating the compatibility between different versions of firmware used for controlling the redundant modules 21 and 22 provided in the storage apparatus 20. Take firmware versions FW1, FW2, FW3, and FW4 as an example. The version FW2 is more recent than the version FW1. The version FW3 is more recent than the version FW2. The version FW4 is more recent than the version FW3. The information 11a includes the following compatibility information with respect to the versions FW1, FW2, FW3, and FW4.

The firmware of the version FW1 is compatible with the firmware of the version FW2, and is not compatible with the firmware of the versions FW3 and FW4. The firmware of the version FW2 is compatible with the firmware of the versions FW1 and FW3, and is not compatible with the firmware of the version FW4. The firmware of the version FW3 is compatible with the firmware of the versions FW2 and FW4, and is not compatible with the firmware of the version FW1. The firmware of the version FW4 is compatible with the firmware of the version FW3, and is not compatible with the firmware of the versions FW1 and FW2.

The computing unit 12 receives an instruction for updating the firmware of the modules 21 and 22 from a first version to a second version that is not compatible with the first version. The computing unit 12 may receive a predetermined operation input by the user using an input device connected to the firmware update apparatus 10, as an instruction for updating the version of the firmware. The computing unit 12 receives, for example, an instruction for updating from the version FW1 (first version) to the version FW4 (second version). According to the information 11a, the firmware of the version FW4 is not compatible with the firmware of the version FW1.

The computing unit 12 refers to the storage unit 11 so as to apply, alternately to one of the two modules, firmware of a version that is one of versions from the first version to the second version, that is compatible with the firmware of the version currently applied to the counterpart module, and that is more recent than the version currently applied to the counterpart module. That is, the computing unit 12 does not apply the firmware of the same version to the two modules, except for the first and second versions.

Note that, for one of two redundant modules, the other one of the modules is a "counterpart module". For example, the counterpart module of the module 21 is the module 22. The counterpart module of the module 22 is the module 21.

For example, the computing unit 12 determines to update the firmware of the module 22 first. The computing unit 12 may determine which of the modules is to be updated first in accordance with predetermined criteria (for example, if there is a main-sub relationship between the modules 21 and 22, the sub module is updated first). Then, the computing unit 12 refers to the information 11a so as to execute the following update procedure 12a.

The computing unit 12 applies, to the module 22, the firmware of the version FW2 that is compatible with the firmware of the version FW1 currently applied to the counterpart module of the module 22, namely, the module 21, and that is more recent than the version FW1 (step S1).

The computing unit 12 applies, to the module 21, the firmware of the version FW3 that is compatible with the firmware of the version FW2 currently applied to the counterpart module of the module 21, namely, the module 22, and that is more recent than the version FW2 (step S2). Note that the computing unit 12 does not apply the firmware of the version FW2 to the module 21.

The computing unit 12 applies, to the module 22, the firmware of the version FW4 that is compatible with the firmware of the version FW3 currently applied to the counterpart module of the module 22, namely, the module 21, and that is more recent than the version FW3 (step S3). Note that the computing unit 12 does not apply the firmware of the version FW3 to the module 22.

The version FW4 currently applied to the module 22 is the firmware of the final update destination version. Therefore, the computing unit 12 applies the firmware of the version FW4 to the module 21 as well (step S4).

According to the firmware update apparatus 10, when updating the firmware of the modules 21 and 22 from the first version to the second version, firmware of a version that is one of versions from the first version to the second version, that is compatible with the firmware of the version currently applied to the counterpart module, and that is more recent than the version currently applied to the counterpart module is applied alternately to one of the two modules. This makes it possible to increase the speed of updating firmware.

There may be a procedure that does not refer to the information 11a (a procedure different from the update procedure 12a). For example, there may be a method that sequentially updates the firmware of both the modules one generation by one generation. As mentioned above, this method is possible because the compatibility of firmware is supposed to be maintained when the difference in version is one generation. More specifically, first, the firmware of the version FW2 is applied to the module 22 (first step). Then, the firmware of the version FW2 is applied to the module 21 (second step). Then, the firmware of the version FW3 is applied to the module 22 (third step). Then, the firmware of the version FW3 is applied to the module 21 (fourth step). Then, the firmware of the version FW4 is applied to the module 22 (fifth step). Then, the firmware of the version FW4 is applied to the module 21 (sixth step).

However, this method might increase the number of steps of the firmware update procedure. As the number of steps of the firmware update procedure increases, the risk of the firmware update failing increases. In view of this, the firmware update apparatus 10 applies, alternately to one of the systems, firmware of a version which is compatible with the counterpart system and is more recent than that applied to the counterpart system. This reduces the number of steps of the firmware update procedure.

For example, applying new firmware to one module is regarded as one step. Then, the above procedure that does not refer to the information 11a needs a total of 6 steps to update the firmware of the two modules from the version FW1 to the version FW4. On the other hand, the update procedure 12a used by the firmware update apparatus 10 only needs a total of 4 steps (steps S1 through S4 described above). Thus, it is possible to reduce the number of steps of the firmware update procedure, and thus to increase the speed of updating the firmware.

Note that the firmware may be a set of a plurality of pieces of sub firmware. For example, in the case where the modules 21 and 22 are modules that control the entire operations of the storage apparatus 20, the modules 21 and 22 may control the operations of other types of modules such as a communication module, a connection module for connection to the storage device groups 23 and 24, and the like, as mentioned above. In this case, the modules 21 and 22 may execute firmware of the modules 21 and 22 and firmware of the other types of modules. If the firmware of each type of module is regarded as a piece of sub firmware (module-specific firmware), a combination of pieces of sub firmware may be regarded as a single piece of firmware. In this case as well, it is possible to create information similar to the information 11a for the firmware of each version, and to update the firmware based on the information. Further, the processor 21c or the processor 22c may provide the function of the computing unit 12.

(b) Second Embodiment

Figure 2:
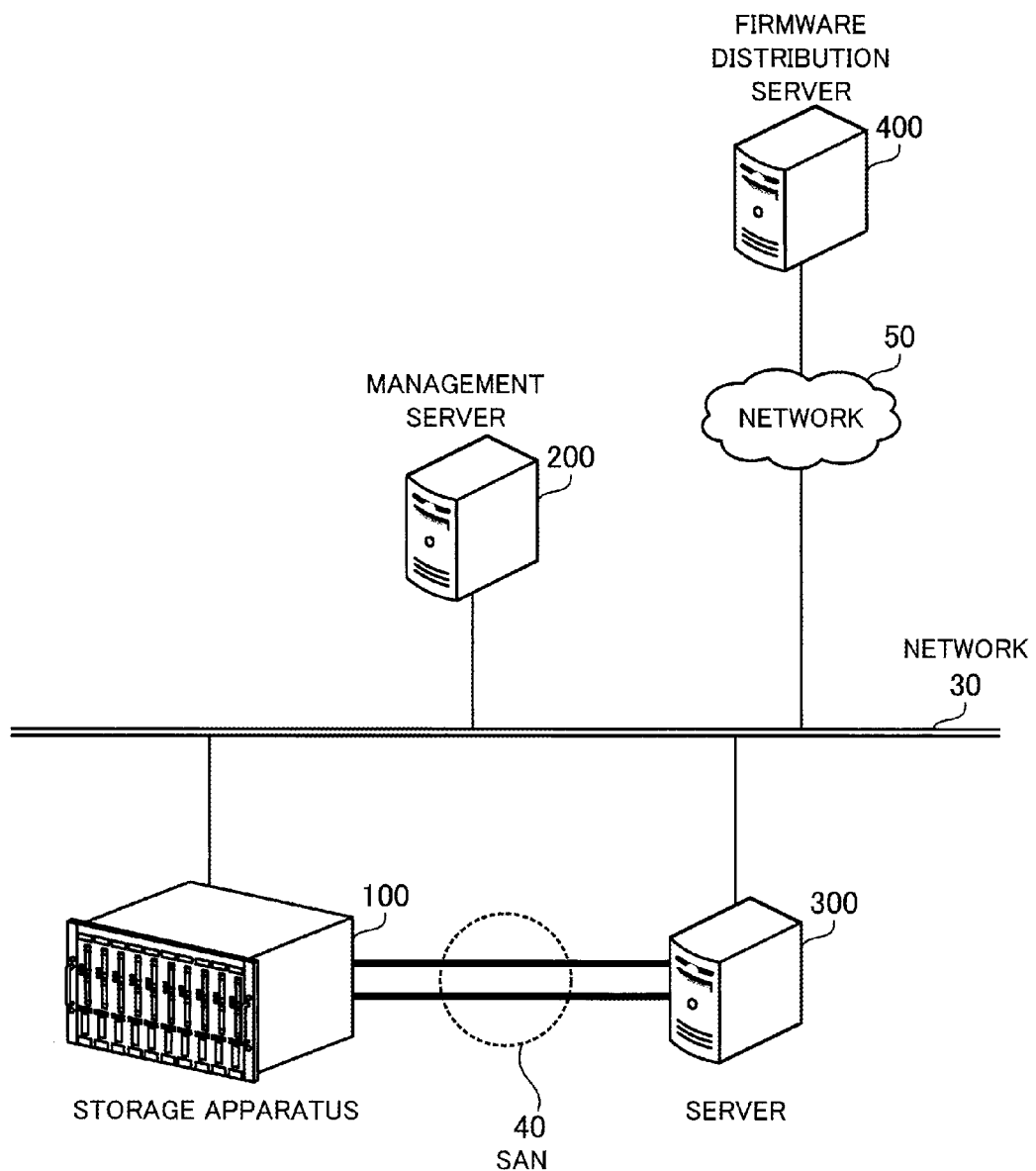
FIG. 2 illustrates an information processing system according to a second embodiment.

FIG. 2 illustrates an information processing system according to a second embodiment. The information processing system of the second embodiment includes a storage apparatus 100, a management server 200, a server 300, and a firmware distribution server 400. The storage apparatus 100, the management server 200, and the server 300 are connected to a network 30. The network 30 is, for example, a local area network (LAN).

The storage apparatus 100 and the server 300 are connected to a storage area network (SAN) 40. The network 30 is connected to a network 50. The network 50 is, for example, a wide area network (WAN) such as the Internet and the like. The firmware distribution server 400 is connected to the network 50.

The storage apparatus 100 stores user data used for processing by the server 300. The storage apparatus 100 executes firmware and controls operations of hardware modules of the storage apparatus 100.

The management server 200 is a server computer that performs operational management of the storage apparatus 100.

The server 300 is a server computer that accesses the user data stored in the storage apparatus 100.

The firmware distribution server 400 is a server computer that distributes firmware to be used by the storage apparatus 100 to the storage apparatus 100 or the management server 200. The firmware is updated in accordance with enhancement of functions or a modification to the program. When the firmware is updated, the firmware distribution server 400 distributes the updated firmware via the network 50. Note that the term "firmware" may be hereinafter abbreviated as "FW".

Figure 3:
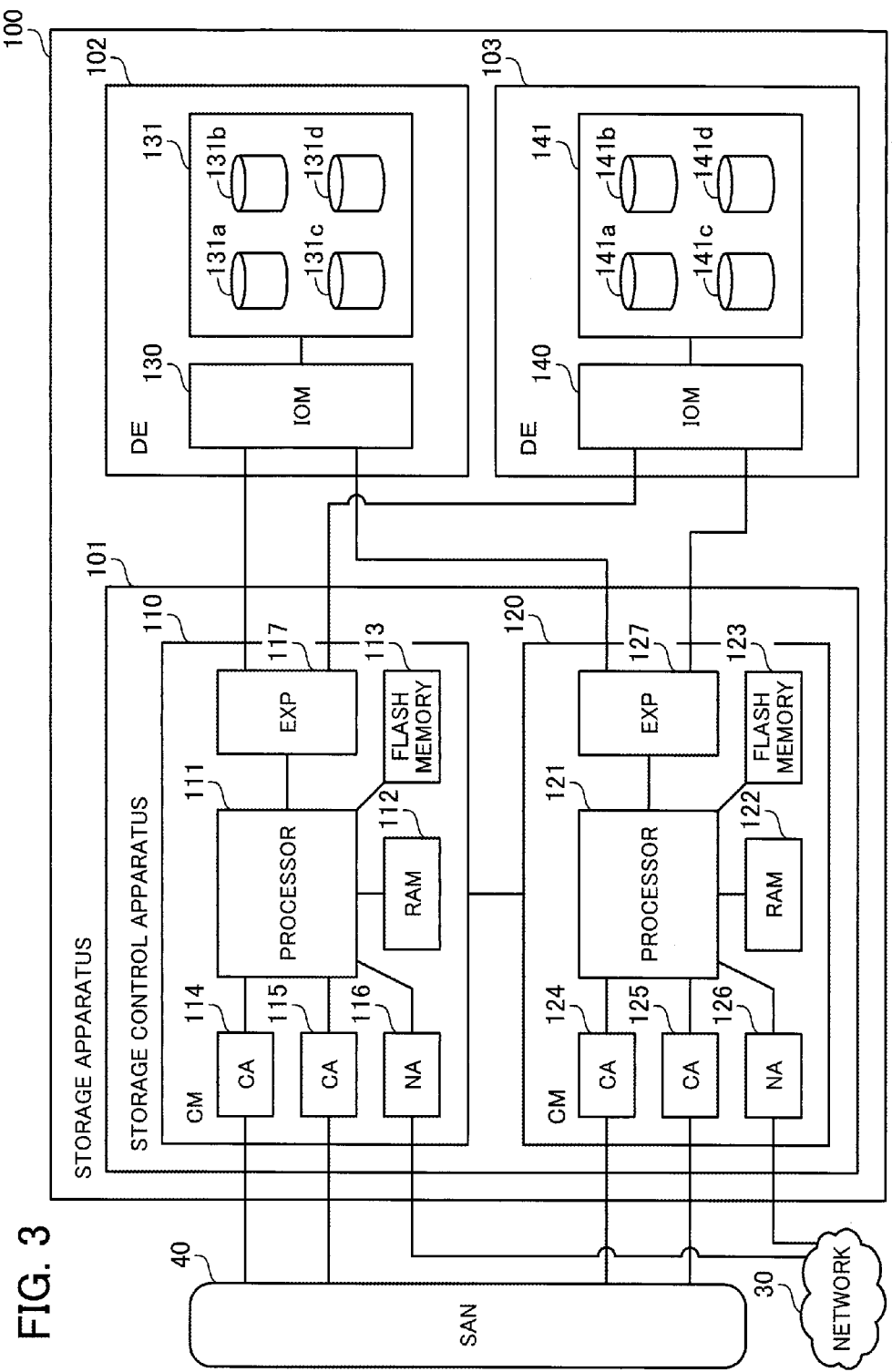
FIG. 3 illustrates an example of the hardware of a storage apparatus according to the second embodiment.

FIG. 3 illustrates an example of the hardware of the storage apparatus 100 according to the second embodiment. The storage apparatus 100 includes a storage control apparatus 101 and drive enclosures (DEs) 102 and 103. The storage control apparatus 101 controls operations of the storage apparatus 100. The storage control apparatus 101 includes controller modules (CMs) 110 and 120.

The controller modules 110 and 120 manage the storage space of the drive enclosures 102 and 103 and control access to the drive enclosures 102 and 103. The controller modules 110 and 120 are redundant in the storage control apparatus 101.

The controller module 110 includes a processor 111, a RAM 112, a flash memory 113, channel adapters (CAs) 114 and 115, a network adapter (NA) 116, and an expander (EXP) 117.

The processor 111 is a processor that controls information processing performed by the controller module 110. The processor 111 may be a multiprocessor. The processor 111 may be, for example, a CPU, a DSP, an ASIC, an FPGA, or the like. Alternatively, the processor 111 may be a combination of two or more of the elements selected from CPU, DSP, ASIC, FPGA, and the like.

The RAM 112 is a primary storage device of the controller module 110. The RAM 112 temporarily stores at least part of a firmware program to be executed by the processor 111.

The flash memory 113 is a secondary storage device of the controller module 110. The flash memory 113 is a non-volatile semiconductor memory. The flash memory 113 stores the firmware program and the like.

The channel adapters 114 and 115 are communication interfaces that communicate with the server 300 via the SAN 40. The channel adapters 114 and 115 are redundant.

The network adapter 116 is a communication interface that communicates with other computers via the network 30. The controller module 110 may include a plurality of network adapters.

The expander 117 is a communication interface that communicates with the drive enclosures 102 and 103.

The controller module 120 includes a processor 121, a RAM 122, a flash memory 123, channel adapters 124 and 125, a network adapter 126, and an expander 127. Each element of the controller module 120 corresponds to the element of the controller module 110 denoted by the same name.

Note that the storage control apparatus 101 may be regarded as an example of the firmware update apparatus 10 of the first embodiment.

Each of the drive enclosures 102 and 103 accommodates a plurality of HDDs (magnetic disk drives), and provides a large storage space by combining the plurality of HDDs. The drive enclosure 102 includes an input and output module (IOM) 130 and an HDD group 131.

The input and output module 130 executes access such as writing data to and reading data from the storage space of the HDD group 131, in accordance with instructions from the controller modules 110 and 120. The HDD group 131 includes a plurality of HDDs, such as HDDs 131a, 131b, 131c, 131d and so on. The drive enclosure 102 may include other non-volatile storage media such as SSDs and the like, in place of the HDDs, or in addition to the HDDs.

The drive enclosure 103 includes an input and output module 140 and an HDD group 141. Similar to the input and output module 130, the input and output module 140 executes access such as writing data to and reading data from the storage space of the HDD group 141, in accordance with instructions from the controller modules 110 and 120. Similar to the drive enclosure 102, the drive enclosure 103 also includes a plurality of HDDs, such as HDDs 141a, 141b, 141c, 141d, and so on. For example, the controller modules 110 and 120 combine a plurality of HDDs (or SSDs) provided in the drive enclosures 102 and 103, respectively, so as to realize a logical storage space while ensuring the access performance and fault tolerance, by using a technique called redundant array of independent disks (RAID).

Figure 4:
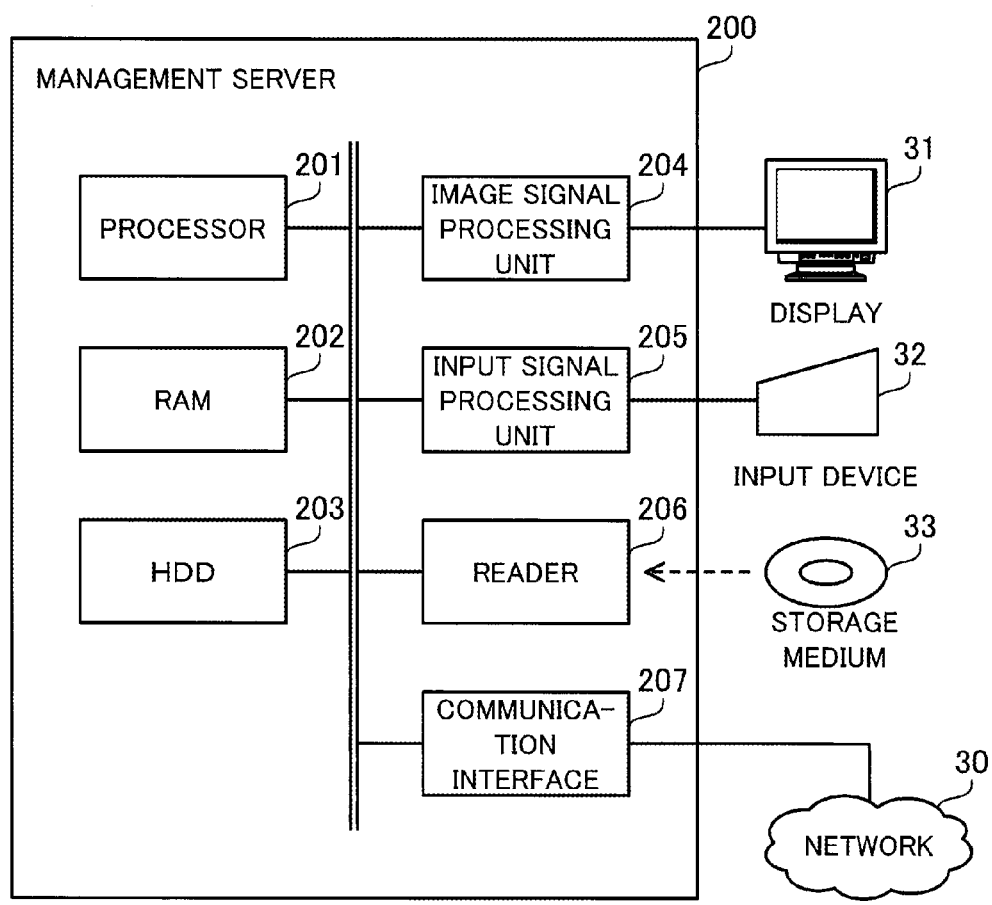
FIG. 4 illustrates an example of the hardware of a management server according to the second embodiment.

FIG. 4 illustrates an example of the hardware of the management server 200 according to the second embodiment. The management server 200 includes a processor 201, a RAM 202, an HDD 203, an image signal processing unit 204, an input signal processing unit 205, a reader 206, and a communication interface 207. Each element is connected to a bus of the management server 200. The server 300 and the firmware distribution server 400 may also be realized with the same hardware as that of the management server 200.

The processor 201 controls information processing performed by the management server 200. The processor 201 may be a multiprocessor. The processor 201 may be, for example, a CPU, a DSP, an ASIC, an FPGA, or the like.

Alternatively, the processor 201 may be a combination of two or more of the elements selected from CPU, DSP, ASIC, FPGA, and the like.

The RAM 202 is a primary storage device of the management server 200. The RAM 202 temporarily stores at least part of the operating system (OS) program and application programs to be executed by the processor 201. The RAM 202 also stores various types of data used for processing by the processor 201.

The HDD 203 is a secondary storage device of the management server 200. The HDD 203 magnetically writes data to and reads data from an internal magnetic disk. The HDD 203 stores the OS program, application programs, and various types of data. The management server 200 may include other types of secondary storage devices such as a flash memory, an SSD, and the like, and may include a plurality of secondary storage devices.

The image signal processing unit 204 outputs an image to a display 31 connected to the management server 200, in accordance with an instruction from the processor 201. Examples of the display 31 include a cathode ray tube (CRT) display, a liquid crystal display, and the like.

The input signal processing unit 205 obtains an input signal from an input device 32 connected to the management server 200, and outputs the input signal to the processor 201. Examples of the input device 32 include a pointing device (such as a mouse, a touch panel, and so on), a keyboard, and the like.

The reader 206 is a device that reads a program and data stored in a storage medium 33. Examples of the storage medium 33 include a magnetic disc (such as a flexible disk (FD), an HDD, and so on), an optical disc (such as a compact disc (CD), a digital versatile disc (DVD), and so on), a magneto-optical disc (MO), and the like. Examples of the storage medium 33 may also include a non-volatile semiconductor memory such as a flash memory card. The reader 206 reads a program and data from the storage medium 33, and stores the read program and data in the RAM 202 or the HDD 203, in accordance with an instruction from the processor 111, for example.

The communication interface 207 is an interface that communicates with other apparatuses via the network 30. The communication interface 207 may be a wired communication interface, or may be a radio communication interface.

Figure 5:
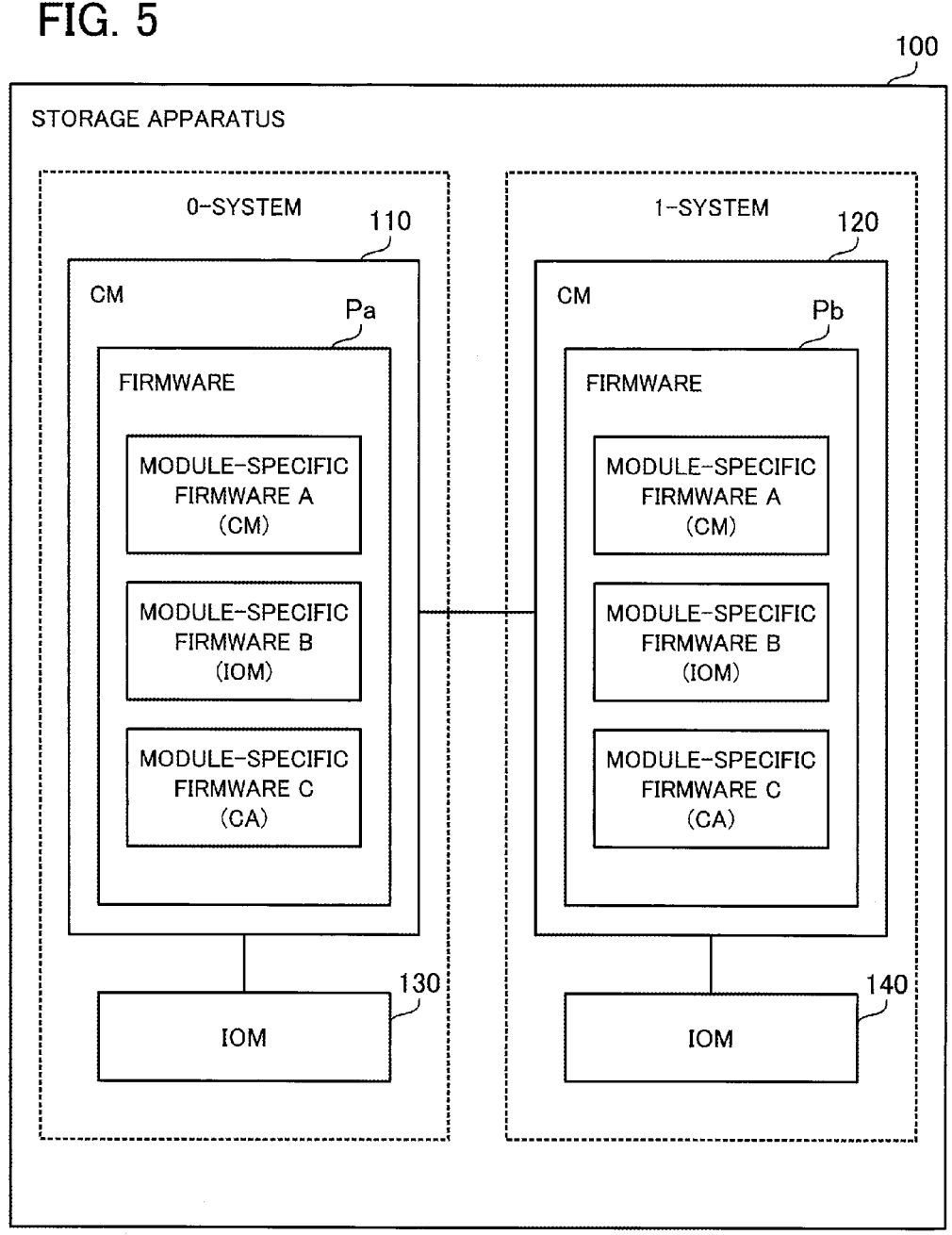
FIG. 5 illustrates an example of firmware of the storage apparatus according to the second embodiment.

FIG. 5 illustrates an example of firmware of the storage apparatus 100 according to the second embodiment. Each type of hardware module of the storage apparatus 100 is provided redundantly. In the second embodiment, a group of modules including the controller module 110 and the input and output module 130 is referred to as a 0-system, and a group of modules including the controller module 120 and the input and output module 140 is referred to as a 1-system, for example. As mentioned above, the controller modules 110 and 120 may include other modules such as the expanders 117 and 127 and the like.

Each module included in the 0-system and the 1-system is provided redundantly. For example, even if the controller module 110 fails, it is possible to cause the controller module 120 to temporarily store a data access request issued to the controller module 110 and perform processing in response to the data access request in place of the controller module 110. For example, when the controller module 110 recovers, the controller module 120 may transmit the stored data access request to the controller module 110 so as to cause the controller module 110 to perform data access. Similar operations are performed when the controller module 120 fails. Further, for example, data may be duplicated and stored in both the HDD groups 131 and 141 (for example, mirroring). Then, even if the input and output module 130 fails and it becomes difficult to access the HDD group 131, the controller modules 110 and 120 are able to maintain data access using the input and output module 140.

The controller module 110 executes firmware Pa. The firmware Pa is software for the controller module 110 to control various modules included in the controller module 110 or to control various modules connected to the controller module 110. Similarly, the controller module 120 executes firmware Pb. The firmware Pb is software for the controller module 120 to control various modules included in the controller module 120 or to control various modules connected to the controller module 120.

Each of the firmware Pa and the firmware Pb includes module-specific firmware A, module-specific firmware B, and module-specific firmware C. The module-specific firmware A is software used for controlling the entire operations of a controller module (for example, the controller modules 110 and 120). The module-specific firmware B is software used for controlling an input and output module (for example, the input and output modules 130 and 140). The module-specific firmware C is software used for controlling a channel adapter (for example, the channel adapters 114, 115, 124, and 125). Module-specific firmware may be referred to as sub firmware of the firmware Pa or the firmware Pb.

For example, the controller module 110 controls the controller module 110 by using the module-specific firmware A included in the firmware Pa. The controller module 110 controls the input and output modules 130 and 140 by using the module-specific firmware B included in the firmware Pa. The controller module 110 controls the channel adapters 114 and 115 by using the module-specific firmware C included in the firmware Pa. Similarly, the controller module 120 controls the controller module 120, the input and output modules 130 and 140, and the channel adapters 124 and 125 by using the module-specific firmware A, the module-specific firmware B, and the module-specific firmware C included in the firmware Pb.

In the following description, the term "firmware" refers to the firmware Pa or Pb including three types of module-specific firmware as described above. Note that the types of modules described above are merely examples, and the firmware Pa and the firmware Pb may further include other module-specific firmware for controlling another type of module (or may be a set of two types of module-specific firmware).

Figure 6:
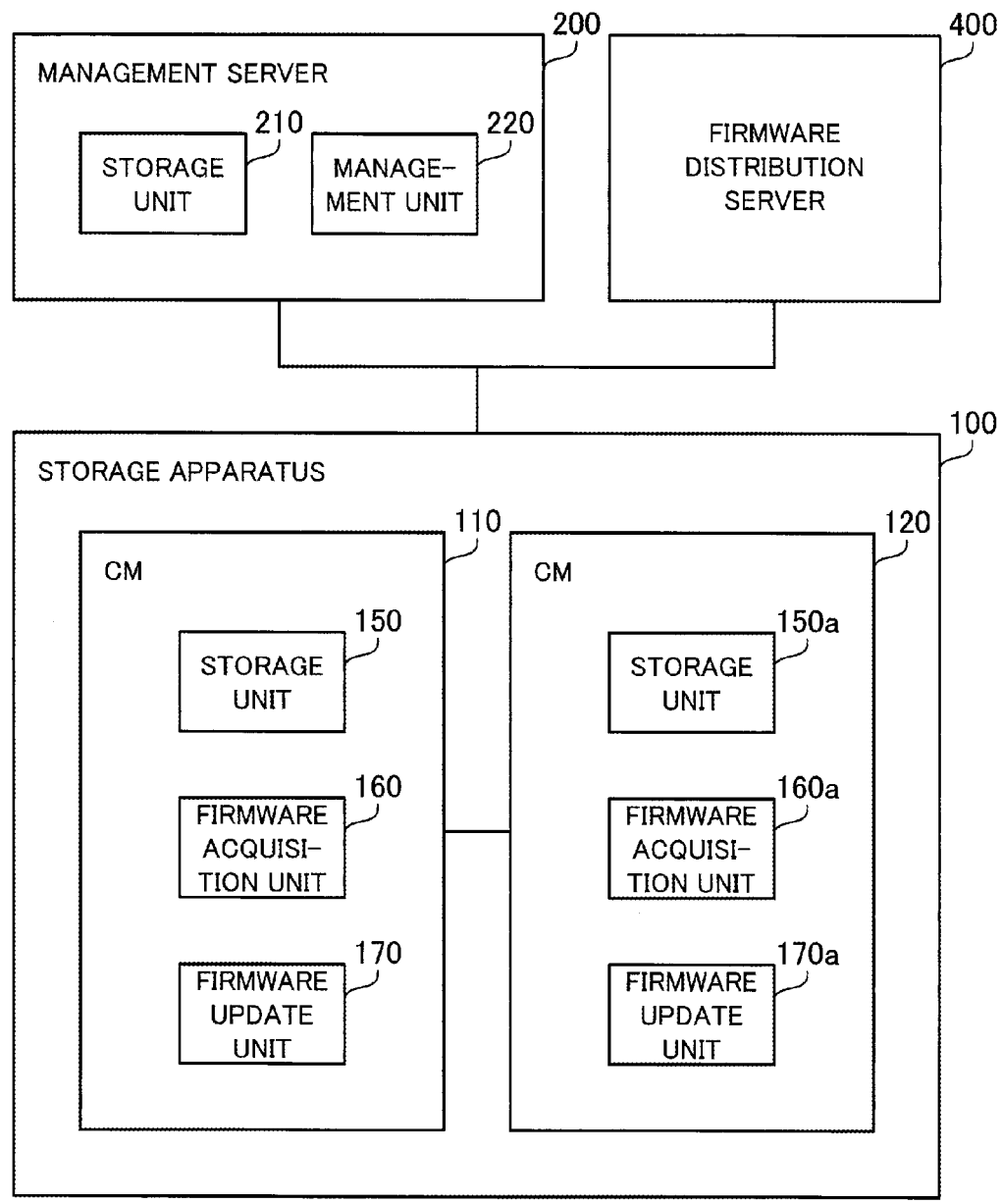
FIG. 6 illustrates an example of functions according to the second embodiment.

FIG. 6 illustrates an example of functions according to the second embodiment. The functions of the controller module 110 may be realized when the processor 111 executes a program stored in the RAM 112. The functions of the controller module 120 may be realized when the processor 121 executes a program stored in the RAM 122. The functions of the management server 200 may be realized when the processor 201 executes a program stored in the RAM 202.

The controller module 110 includes a storage unit 150, a firmware acquisition unit 160, and a firmware update unit 170. The storage unit 150 may be realized as a storage space reserved in the flash memory 113. However, a copy of information stored in the storage unit 150 may be stored in the RAM 112 for processing by the processor 111.

The storage unit 150 stores information on the compatibility between firmware of different versions. Further, the storage unit 150 stores firmware downloaded from the firmware distribution server 400. In the second embodiment, the firmware of the controller module 110 may be updated to a new version by sequentially applying a plurality of pieces of firmware of different versions to the controller module 110. In this case, the storage unit 150 stores information indicating the order in which the plurality of pieces of firmware of different versions are to be applied. Upon updating firmware of an update source version to firmware of an update destination version, firmware corresponding to a version between the update source (starting) version and the update destination (ending) version may be referred to as "intermediate firmware" (or "intermediate FW").

The firmware acquisition unit 160 determines versions of firmware (including intermediate firmware) to be acquired from the firmware distribution server 400, when updating firmware of the current version to firmware of a new version. The firmware acquisition unit 160 acquires firmware of the determined versions from the firmware distribution server 400, and stores the firmware in the storage unit 150. For applying intermediate firmware, the firmware acquisition unit 160 determines the application order of intermediate firmware based on the information on the compatibility stored in the storage unit 150, and stores information indicating the determined application order in the storage unit 150.

The firmware acquisition unit 160 may cause the management server 200 to acquire firmware of the determined versions. In this case, the firmware acquisition unit 160 acquires firmware from the firmware distribution server 400 via the management server 200. The firmware acquisition unit 160 may cause the management server 200 to acquire firmware in the case where access from the storage apparatus 100 to the network 30 is restricted, for example.

The firmware update unit 170 updates the firmware of the controller module 110 in cooperation with the controller module 120, as will be described below.

The controller module 120 includes a storage unit 150*a*, a firmware acquisition unit 160*a*, and a firmware update unit 170*a*. The storage unit 150*a* may be realized as a storage space reserved in the flash memory 123. However, a copy of information stored in the storage unit 150*a* may be stored in the RAM 122 for processing by the processor 121.

The storage unit 150*a* stores information on the compatibility between firmware of different versions. Further, the storage unit 150*a* stores firmware downloaded from the firmware distribution server 400. For applying intermediate firmware to the controller module 120 so as to update the firmware of the controller module 120, the storage unit 150*a* stores information indicating the application order of intermediate firmware.

The firmware acquisition unit 160*a* determines versions of firmware (including intermediate firmware) to be acquired from the firmware distribution server 400, when updating firmware of the current version to firmware of a new version. The firmware acquisition unit 160*a* acquires firmware of the determined versions from the firmware distribution server 400, and stores the firmware in the storage unit 150*a*. For applying intermediate firmware, the firmware acquisition unit 160*a* determines the application order of intermediate firmware based on the information on the compatibility stored in the storage unit 150*a*, and stores information indicating the determined application order in the storage unit 150*a*.

The firmware acquisition unit 160*a* may cause the management server 200 to acquire firmware of the determined versions. In this case, the firmware acquisition unit 160*a* acquires firmware from the firmware distribution server 400 via the management server 200. The firmware acquisition unit 160*a* may cause the management server 200 to acquire firmware in the case where access from the storage apparatus 100 to the network 30 is restricted, for example.

Note that the firmware acquisition units 160 and 160*a* cooperate with each other such that either one of the firmware acquisition units 160 and 160*a* determines firmware to be acquired, acquires firmware of determined versions, and determines the application order of firmware. Alternatively, it may be determined in advance that the firmware acquisition unit 160 (or the firmware acquisition unit 160*a*) is given a priority to perform these operations.

For example, if the firmware acquisition unit 160 acquires firmware from the firmware distribution server 400, the firmware acquisition unit 160*a* acquires firmware to be applied to the controller module 120 from the firmware acquisition unit 160, and stores the firmware in the storage unit 150*a*. In this case, the firmware acquisition unit 160*a* does not need to determine the application order of intermediate firmware (because the firmware update unit 170 is in control of application of intermediate firmware as will be described below).

On the other hand, if the firmware acquisition unit 160*a* acquires firmware from the firmware distribution server 400, the firmware acquisition unit 160 acquires firmware to be applied to the controller module 110 from the firmware acquisition unit 160*a*, and stores the firmware in the storage unit 150. In this case, the firmware acquisition unit 160 does not need to determine the application order of intermediate firmware (because the firmware update unit 170*a* is in control of application of intermediate firmware as will be described below).

The firmware update unit 170*a* updates the firmware of the controller module 120 in cooperation with the firmware update unit 170. For example, one of the firmware update units 170 and 170*a* that acquired firmware from the firmware distribution server 400 is in control of update of the firmware of the controller modules 110 and 120.

For example, in the case where the firmware update unit 170 is in control, the firmware update unit 170 applies firmware to the controller module 110, and specifies for the firmware update unit 170*a* the version of the next firmware to be applied to the controller module 120. In the case where the application order of intermediate firmware has been determined as described above, the firmware update unit 170 specifies for the firmware update unit 170*a* the version of the next firmware to be applied to the controller module 120 in accordance with the determined application order.

On the other hand, in the case where the firmware update unit 170*a* is in control, the firmware update unit 170*a* applies firmware to the controller module 120, and specifies for the firmware update unit 170 the version of the next firmware to be applied to the controller module 110. In the case where the application order of intermediate firmware has been determined as described above, the firmware update unit 170*a* specifies for the firmware update unit 170 the version of the next firmware to be applied to the controller module 110 in accordance with the determined application order.

Application of firmware to the controller modules 110 and 120 is performed in the following manner. (1) The firmware update unit 170 stores a program of the firmware of the update destination version in the storage unit 150. (2) The firmware update unit 170 restarts the controller module 110. Since the storage unit 150 is non-volatile storage, the program stored in the storage unit 150 is retained even when the controller module 110 is shut down. (3) When the controller module 110 is started, the firmware update unit 170 reads the program of the firmware of the update destination version from the storage unit 150, and loads the program to the RAM 112. Thus, the firmware to be executed by the processor 111 is updated (new firmware is applied to the controller module 110). The firmware update unit 170a updates the firmware of the controller module 120 in the same manner.

The management server 200 includes a storage unit 210 and a management unit 220. The storage unit 210 may be realized as a storage space reserved in the RAM 202 or the HDD 203. The storage unit 210 stores information used for processing by the management unit 220.

The management unit 220 performs operational management of the storage apparatus 100. As described above, the management unit 220 may download the firmware of the storage apparatus 100 in response to a request from the storage apparatus 100.

FIG. 7 illustrates an example of a firmware compatibility table 151 according to the second embodiment. The firmware compatibility table 151 is stored in advance in the storage units 150 and 150a. The firmware compatibility table 151 is information on the compatibility between firmware of different versions. The firmware compatibility table 151 contains the following fields: general version, module-specific version, and total compatibility index.

The "general version" field stores the version (which may be referred to as the "general version") of the entire firmware including a combination of pieces of module-specific firmware. That is, the "version of firmware" indicates the general version.

The "module-specific version" field stores the version of each piece of module-specific firmware (which may be referred to as "module-specific version"). That is, the "version of module-specific firmware" indicates the module-specific version.

The "total compatibility index" field stores the total compatibility index for the firmware. The total compatibility index is the total of compatibility indexes of the individual modules (described below). The total compatibility index is used for determining whether there is compatibility between modules of different general versions.

For example, the firmware compatibility table 151 stores a record including "V1" as the general version, "A1, B1, C1" as the module-specific versions, and "X1" as the total compatibility index. As for "A1, B1, C1" stored as the module-specific versions, the value "A1" indicates the version A1 of module-specific firmware A. The value "B1" indicates the version B1 of module-specific firmware B. The value "C1" indicates the version C1 of module-specific firmware C. That is, this record indicates that the firmware of the general version V1 is a combination of the module-specific firmware A of the module-specific version A1, the module-specific firmware B of the module-specific version B1, and the module-specific firmware C of the module-specific version C1, and its total compatibility index is X1.

Likewise, the firmware compatibility table 151 stores a record including "V2" as the general version, "A2, B1, C1" as the module-specific versions, and "X2" as the total compatibility index. That is, this record indicates that the firmware of the general version V2 is a combination of the module-specific firmware A of the module-specific version A2, the module-specific firmware B of the module-specific version B1, and the module-specific firmware C of the module-specific version C1, and its total compatibility index is X2.

Note that in the example of the firmware compatibility table 151, the most recent general version appears last.

According to the firmware compatibility table 151, the general version V2 is one generation more recent than the general version V1. A general version Va is multiple generations more recent than the general version V2. A general version Va1 is one generation more recent than the general version Va. A general version Vb is multiple generations more recent than the general version Va1. A general version Vb1 is one generation more recent than the general version Vb. A general version Vc is multiple generations more recent than the general version Vb1.

For example, a difference $\Delta X$ in total compatibility index between different general versions indicates the degree of compatibility gap (degree of incompatibility) between two pieces of firmware of different general versions. The degree of incompatibility is an index indicating the degree of compatibility gap between two pieces of firmware of different versions. For example, two pieces of firmware of different versions are determined to be compatible if the degree of incompatibility is less than or equal to a threshold. Further, two pieces of firmware of different versions are determined to be incompatible if the degree of incompatibility is greater than the threshold.

Figure 8:
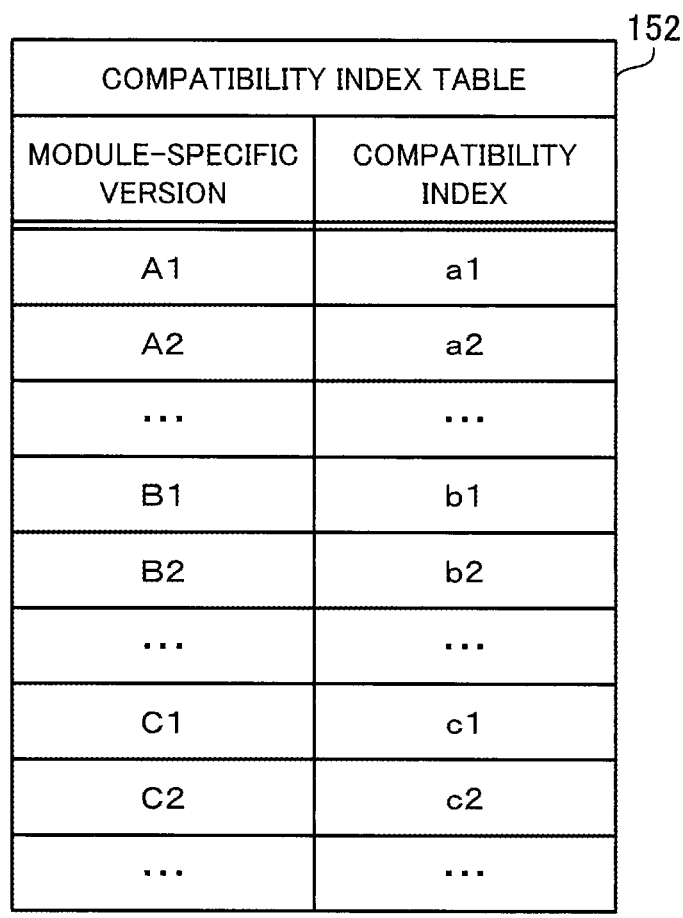
FIG. 8 illustrates an example of a compatibility index table according to the second embodiment.

FIG. 8 illustrates an example of a compatibility index table 152 according to the second embodiment. The compatibility index table 152 is stored in advance in the storage units 150 and 150a. The compatibility index table 152 is information indicating the compatibility index of each module-specific version. The compatibility index table 152 contains the following fields: module-specific version and compatibility index.

The "module-specific version" field stores the module-specific version. The "compatibility index" field stores the compatibility index. The more recent the module-specific version is, the greater the value of the compatibility index is. The difference between the compatibility indexes of two module-specific versions indicates the degree of incompatibility between pieces of module-specific firmware of the two module-specific versions. The greater the degree of incompatibility is, the greater the difference between cooperative functions and the like of the pieces of module-specific firmware is.

For example, the compatibility index table 152 stores a record including "A1" as the module-specific version and "a1" as the compatibility index. This record indicates that the compatibility index of the module-specific version A1 is a1.

Likewise, the compatibility index table 152 stores the compatibility index of each of the other module-specific versions (module-specific versions A2 and so on) of the module-specific firmware A. Further, the compatibility index table 152 also stores the compatibility index of each module-specific version of the module-specific firmware B and the module-specific firmware C.

For example, the firmware of the general version V1 is a combination of pieces of module-specific firmware "A1", "B1", and "C1". In this case, the total compatibility index of the general version V1 is X1=a1+b1+c1. When the firmware acquisition units 160 and 160a are able to acquire information on the correspondence relationship between the general version and the module-specific versions, then the firmware acquisition units 160 and 160a are able to calculate the total compatibility index for the general version by referring to the compatibility index table 152.

FIGS. 9A and 9B illustrate an example of an active replacement executability threshold according to the second embodiment. FIG. 9A illustrates active replacement executability threshold information 153. The active replacement executability threshold information 153 is stored in advance in the storage units 150 and 150a. The active replacement executability threshold information 153 includes a threshold Y. The threshold Y is compared with the degree of incompatibility described with reference to FIG. 7 so as to be used for determining the compatibility between different pieces of firmware.

FIG. 9B illustrates an example of determining the compatibility using the active replacement executability threshold. For example, consider the general versions V1, V2, and Va, Va1.

(1) According to the example of the firmware compatibility table 151, the total compatibility index of the general version V1 is $X1=a1+b1+c1$.

(2) The total compatibility index of the general version V2 is $X2=a2+b1+c1$. The degree of incompatibility between the general versions V1 and V2 is $\Delta X=X2-X1$. Supposing $X2-X1 \leq Y$, then the firmware of the general version V1 and the firmware of the general version V2 are compatible with each other. Accordingly, even if the firmware of the general version V1 is applied to the controller module 110 and the firmware of the general version V2 is applied to the controller module 120 (or vice versa), the controller modules 110 and 120 are able to cooperate with each other to appropriately perform active replacement of firmware.

(3) The total compatibility index of the general version Va is $Xa=a3+b3+c1$. The degree of incompatibility between the general versions V1 and Va is $\Delta X=Xa-X1$. Supposing $Xa-X1 \leq Y$, then the firmware of the general version V1 and the firmware of the general version Va are compatible with each other. Accordingly, even if the firmware of the general version V1 is applied to the controller module 110 and the firmware of the general version Va is applied to the controller module 120 (or vice versa), the controller modules 110 and 120 are able to cooperate with each other to appropriately perform active replacement of firmware.

(4) The total compatibility index of the general version Va1 is $Xa1=a3+b3+c2$. The degree of incompatibility between the general versions V1 and Va1 is $\Delta X=Xa1-X1$. Supposing $Xa1-X1>Y$, then the firmware of the general version V1 and the firmware of the general version Va1 are not compatible with each other. Accordingly, if the firmware of the general version V1 is applied to the controller module 110 and the firmware of the general version Va1 is applied to the controller module 120 (or vice versa), the controller modules 110 and 120 might not be able to appropriately cooperate with each other upon performing active replacement of firmware.

In this case, the general version Va is the most recent general version with which firmware active replacement of the general version V1 is possible. Then, in the same manner as described above, the storage apparatus 100 may also determine the general version with which active replacement of the general version Va is possible.

(5) The total compatibility index of the general version Va is Xa as mentioned in (3).

(6) The total compatibility index of the general version Va1 is Xa1 as mentioned in (4). The degree of incompatibility between the general versions Va and Va1 is $\Delta X=Xa1-Xa$. Supposing $Xa1-Xa \leq Y$, then the firmware of the general version Va and the firmware of the general version Va1 are compatible with each other. Accordingly, even if the firmware of the general version Va1 is applied to the controller module 110 and the firmware of the general version Va is applied to the controller module 120 (or vice versa), the controller modules 110 and 120 are able to cooperate with each other to appropriately perform active replacement of firmware.

(7) The total compatibility index of the general version Vb is $Xb=a5+b3+c2$. The degree of incompatibility between the general versions Va and Vb is $\Delta X=Xb-Xa$. Supposing $Xb-Xa \leq Y$, then the firmware of the general version Va and the firmware of the general version Vb are compatible with each other. Accordingly, even if the firmware of the general version Va is applied to the controller module 110 and the firmware of the general version Vb is applied to the controller module 120 (or vice versa), the controller modules 110 and 120 are able to cooperate with each other to appropriately perform active replacement of firmware.

Then, in the same manner as described above, the storage apparatus 100 may also determine the most recent general version compatible with the general version Va.

The firmware acquisition units 160 and 160a download in advance the firmware compatibility table 151, the compatibility index table 152 and the active replacement executability threshold information 153 from the firmware distribution server 400 into the storage units 150 and 150a. As described above, the total compatibility index in the firmware compatibility table 151 may be obtained from the correspondence relationship between the general version and the module-specific versions in the firmware compatibility table 151 and information in the compatibility index table 152. Accordingly, the storage apparatus 100 may create the firmware compatibility table 151 by acquiring the information on the correspondence relationship between the general version and the module-specific versions and the compatibility index table 152 from the firmware distribution server 400.

FIG. 10 illustrates an example of an intermediate firmware table 154 according to the second embodiment. The intermediate firmware table 154 is stored in the storage units 150 and 150a. The intermediate firmware table 154 may be stored in a storage unit of at least one of the controller modules 110 and 120 that is in control of active replacement of firmware. The intermediate firmware table 154 contains the following fields: application order, general version, module-specific firmware program, and application flag.

The "application order" field stores the order in which the intermediate firmware is to be applied. For example, intermediate firmware with the lowest number is applied first, and intermediate firmware with the highest number is applied last. The "general version" field stores the general version of the intermediate firmware.

The "module-specific firmware program" field stores the body of a module-specific firmware program (corresponding to the general version of the intermediate firmware). Note that in the example of the intermediate firmware table 154, a symbol ("A3" and so on) indicating a module-specific version is used to represent the body of a module-specific firmware program as an element of intermediate firmware. For example, in FIG. 10, "A3" represents the body of a program (module-specific firmware program) corresponding to the version "A3" of the module-specific firmware A.

The "application flag" field stores a flag indicating whether the intermediate firmware described in the record has already been applied to either one of the controller modules. The value "false" indicates that the intermediate firmware has not been applied. The value "true" indicates that the intermediate firmware has already been applied. The default value of the application flag is "false".

For example, the intermediate firmware table 154 stores a record including "1" as the application order, "Va" as the general version, "A3, B3" as the module-specific firmware programs, and "false" as the application flag. This record indicates that the firmware of the general version Va has been acquired as intermediate firmware, and is to be applied first upon firmware update. The record also indicates that a program corresponding to the module-specific firmware A of the version A3 and a program corresponding to the module-specific firmware B of the version B3 have been acquired as elements of the intermediate firmware. The record also indicates that the intermediate firmware has not been applied.

Note that the storage apparatus 100 does not need to acquire module-specific firmware programs for all the module-specific versions corresponding to the general version. For example, the module-specific versions corresponding to the general version Va are "A3", "B3", and "C1". In this case, if the general version immediately before updating to the general version Va is, for example, the general version V1, a module-specific firmware program corresponding to the version C1 does not need to be acquired as a module-specific firmware program corresponding to the general version Va. This is because the differences between the module-specific versions of the general versions V1 and Va are "A3" and "B3", and the module-specific version C1 remains the same.

The same applies to the record whose application order is "2" in the intermediate firmware table 154. For example, if the general version immediately before updating to the general version Vb is the general version Va, a module-specific firmware program corresponding to the version B3 does not need to be acquired as a module-specific firmware program corresponding to the general version Vb. This is because the differences between the module-specific versions of the general versions Va and Vb are "A5" and "C2", and the module-specific version B3 remains the same.

Figure 11:
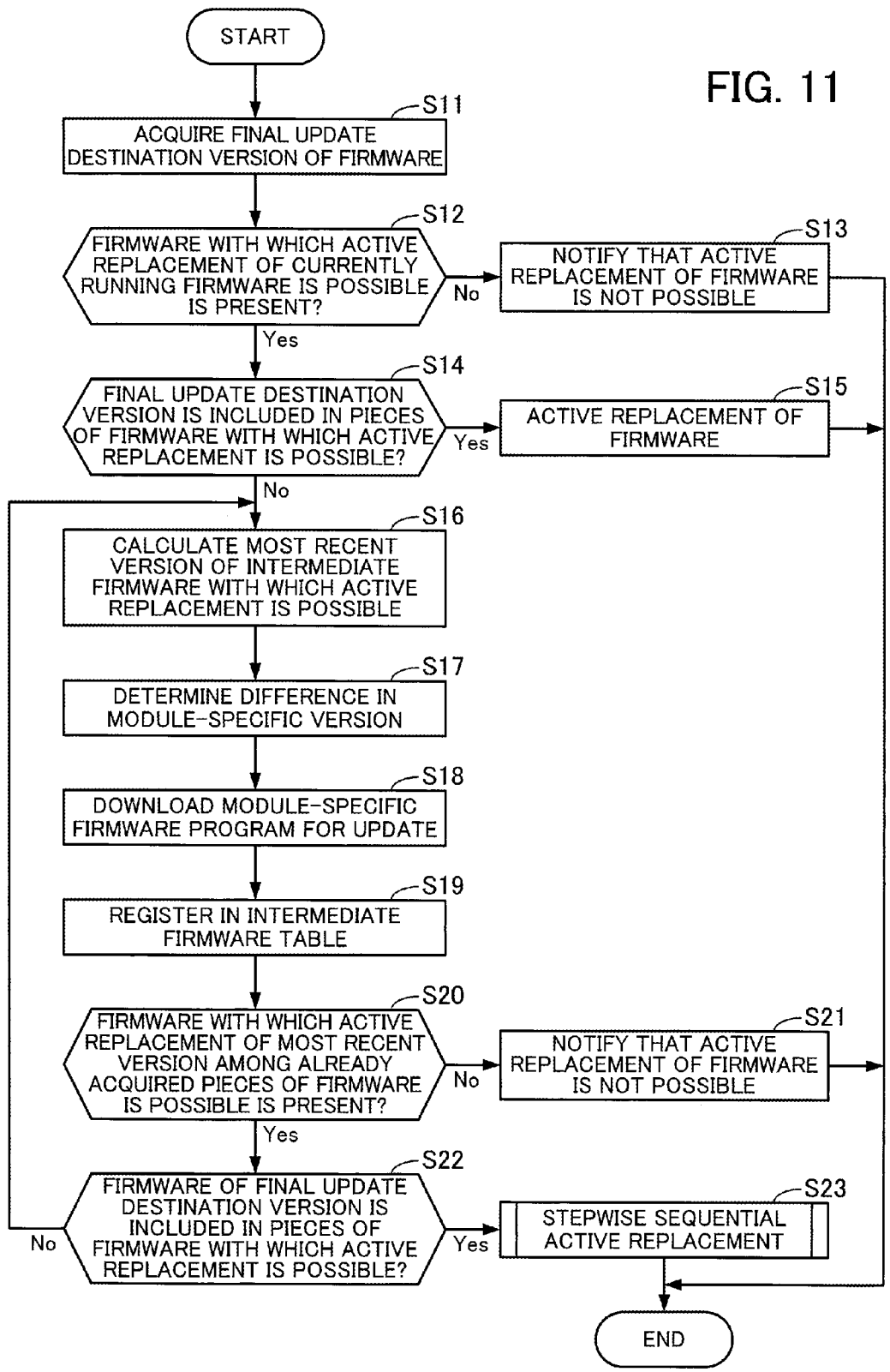
FIG. 11 is a flowchart illustrating an example of firmware update according to the second embodiment.

FIG. 11 is a flowchart illustrating an example of firmware update according to the second embodiment. In the following, the process illustrated in FIG. 11 will be described in order of step number. The procedure of FIG. 11 illustrates the case where the controller module 110 is in control of the firmware update process and the controller module 120 is not. However, a similar procedure is used in the case where the controller module 120 is in control of the firmware update process (the roles are switched between the storage units 150 and 150a, between the firmware acquisition units 160 and 160a, and between the firmware update units 170 and 170a).

(S11) The firmware acquisition unit 160 acquires the final update destination version (which is a general version) of firmware (FW) that is more recent than the current version (the version of the currently running firmware). The final update destination version is the final version to be aimed at by the current firmware update. When both the version of the firmware applied to the 0-system and the version of the firmware applied to the 1-system reach the final update destination version, the firmware update is completed. The final update destination version is, for example, entered in the storage apparatus 100 by the user. For example, the user may operate the management server 200 and enter the final update destination version in the storage apparatus 100 via the network 30. Alternatively, the firmware acquisition unit 160 may acquire the final update destination version (for example, the most recent version) of firmware, when a notification indicating that distribution of firmware of the most recent version has started is received from the firmware distribution server 400 via the network 30, or the like.

(S12) The firmware acquisition unit 160 refers to the firmware compatibility table 151 stored in the storage unit 150 so as to determine whether there is firmware of a version with which active replacement of firmware of the currently running version is possible (whether there is firmware of a version compatible with firmware of the currently running version). If there is such firmware, the process proceeds to step S14. If there is not such firmware, the process proceeds to step S13. For determining whether there is firmware with which active replacement of the currently running firmware is possible, the difference $\Delta X$ between the total compatibility index of the version of the currently running firmware and the total compatibility index of another version is compared with the active replacement executability threshold Y as described in FIGS. 9A and 9B. If there is another version that satisfies $\Delta X \leq Y$, there is firmware with which active replacement of the currently running firmware is possible. If there is not another version that satisfies $\Delta X \leq Y$, there is no firmware with which active replacement of the currently running firmware is possible.

(S13) The firmware acquisition unit 160 notifies the user that it is not possible to perform active replacement of firmware. For example, the firmware acquisition unit 160 may notify the user via the management server 200 that it is not possible to perform active replacement, by transmitting a predetermined message to the management server 200 via the network 30. The firmware acquisition unit 160 may notify the user by displaying a message on a display panel of the storage apparatus 100 or by transmitting a message (for example, e-mail) to a predetermined address. Then, the process ends.

(S14) The firmware acquisition unit 160 determines whether the firmware of the final update destination version is included in pieces of firmware with which active replacement of firmware is possible. If the firmware of the final update destination version is included, the process proceeds to step S15. If the firmware of the final update destination version is not included, the process proceeds to step S16.

(S15) The firmware update unit 170 performs active replacement of firmware. In this case, the firmware update unit 170 is able to update the currently running firmware to the firmware of the final update destination version without involving update to intermediate firmware. For example, the firmware update unit 170 downloads a program of the firmware of the final update destination version from the firmware distribution server 400, and stores the program in the storage unit 150. The firmware update unit 170 provides the downloaded program of the firmware to the controller module 120, and issues an instruction to start active replacement of firmware. Then, the firmware update unit 170a applies the firmware of the final update destination version to the controller module 120 (which involves restarting the controller module 120). When the application to the controller module 120 completes, the firmware update unit 170 applies the firmware of the final update destination version to the controller module 110 (which involves restarting the controller module 110). Then, the process of active replacement of firmware is completed.

(S16) The firmware acquisition unit 160 refers to the firmware compatibility table 151 so as to calculate the most recent version of intermediate firmware with which active replacement is possible. For example, when executing step S16 for the first time, the firmware acquisition unit 160 calculates the most recent version of intermediate firmware with which active replacement of the version of the currently running firmware is possible (the most recent version of intermediate firmware compatible with the version of the currently running firmware). For example, consider the case in which the version of the currently running firmware is V1 and the final update destination version is Vb. In the example of FIGS. 9A and 9B, the most recent version of intermediate firmware with which active replacement of the version V1 is possible is the version Va. This is because although active replacement of the version V1 with the version Va is possible, active replacement of the version V1 with the version Va1 (which is one generation more recent than the version Va) is not possible. When executing step S16 after acquiring the intermediate firmware in step S17 and the steps that follow, the firmware acquisition unit 160 calculates the most recent version of intermediate firmware (that has not been acquired) with which active replacement of the most recent version among already acquired pieces of intermediate firmware is possible. The calculation method used here is the same as that used for calculating the version Va of intermediate firmware for the version V1.

(S17) The firmware acquisition unit 160 refers to the firmware compatibility table 151 so as to determine the difference in module-specific version. For example, consider determining the difference between the general version V1 and the general version Va. The module-specific versions of the general version V1 are "A1", "B1", and "C1". The module-specific versions of the general version Va are "A3", "B3, and "C1". That is, the differences in module-specific version are "A3" and "B3".

(S18) The firmware acquisition unit 160 downloads a module-specific firmware program for update, from the firmware distribution server 400. For example, if the differences in module-specific version calculated in step S17 are "A3" and B3", the firmware acquisition unit 160 downloads the program of the version A3 of the module-specific firmware A and the program of the version B3 of the module-specific firmware B. In this case, the firmware acquisition unit 160 does not need to download a program corresponding to the version C1 of the module-specific firmware C.

(S19) The firmware acquisition unit 160 registers the downloaded program in association with the application order and the general version in the intermediate firmware table 154. For example, when registering the first record in the intermediate firmware table 154, "1" is registered as the application order. When registering the second record, "2" is registered as the application order. In this way, each time the firmware acquisition unit 160 registers a new record, the firmware acquisition unit 160 increments the value by 1 and registers the incremented value in the application order field. In the application flag field, a default value "false" is registered.

(S20) The firmware acquisition unit 160 refers to the firmware compatibility table 151 and the intermediate firmware table 154 so as to determine whether there is firmware which has not been acquired and with which active replacement of the most recent version among already acquired pieces of firmware is possible. If there is not such firmware, the process proceeds to step S21. If there is such firmware, the process proceeds to step S22.

(S21) The firmware acquisition unit 160 notifies the user that it is not possible to perform active replacement of firmware. The notification method used here may be the same as that used in step S13. Then, the process ends.

(S22) The firmware acquisition unit 160 determines whether the firmware of the final update destination version is included in pieces of firmware which have not been acquired and with which active replacement is possible. If the firmware of the final update destination version is included, the process proceeds to step S23. If the firmware of the final update destination version is not included, the process returns to step S16.

(S23) The firmware update unit 170 performs active replacement of firmware using intermediate firmware (which is referred to as "stepwise sequential active replacement").

Figure 12:
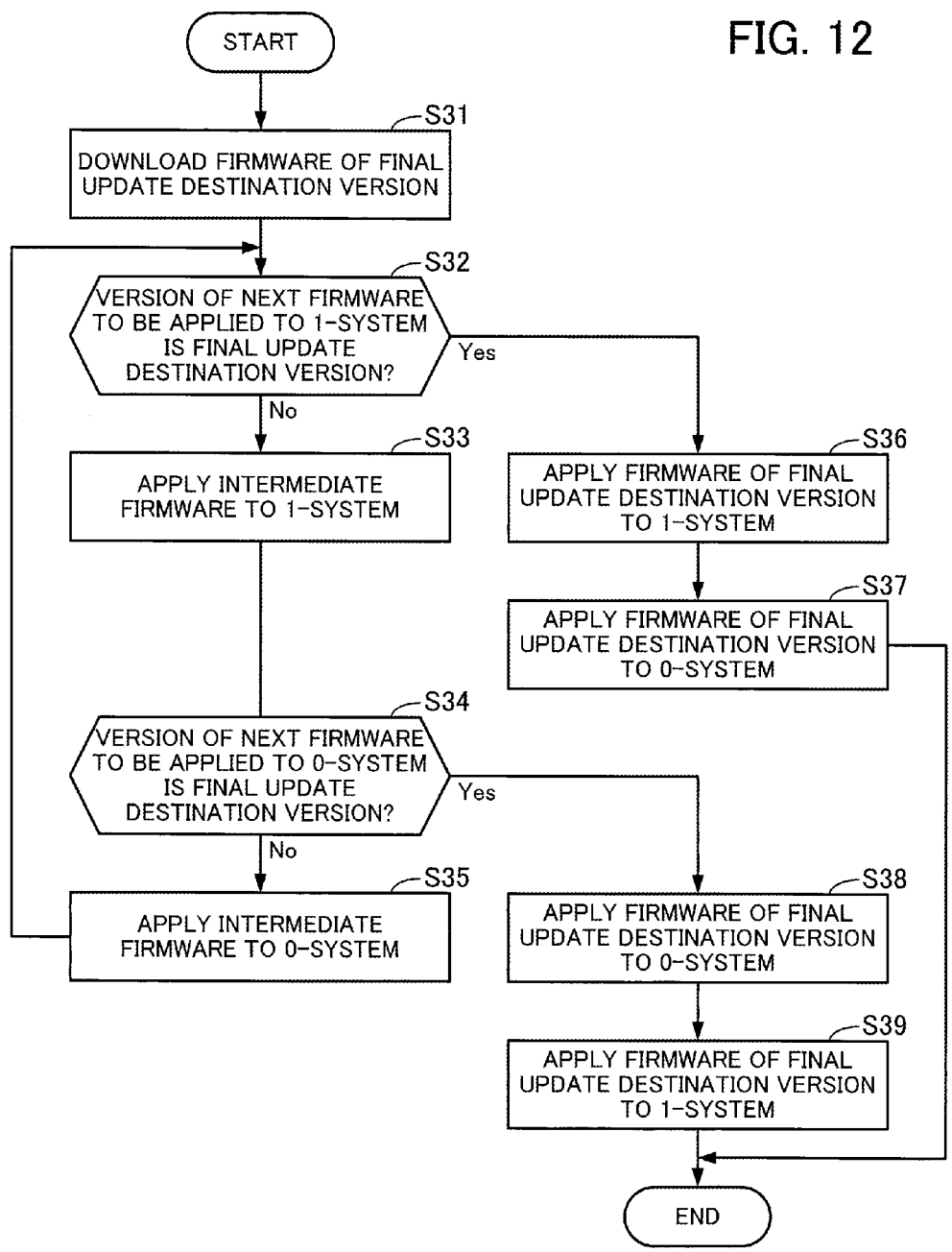
FIG. 12 is a flowchart illustrating an example of a stepwise sequential active replacement according to the second embodiment.

FIG. 12 is a flowchart illustrating an example of a stepwise sequential active replacement according to the second embodiment. In the following, the process illustrated in FIG. 12 will be described in order of step number. The procedure described below corresponds to step S23 of FIG. 11.

(S31) The firmware acquisition unit 160 downloads a program of the firmware of the final update destination version from the firmware distribution server 400, and stores the program in the storage unit 150.

(S32) The firmware update unit 170 refers to the intermediate firmware table 154 so as to determine whether the version of the next firmware to be applied to the 1-system is the final update destination version. If the version of the next firmware is not the final update destination version, the process proceeds to step S33. If the version of the next firmware is the final update destination version, the process proceeds to step S36. More specifically, if all the application flags in the intermediate firmware table 154 are "true", the version of the next firmware to be applied to the 1-system is the final update destination version. If there is a record whose application flag is "false" in the intermediate firmware table 154, the version of the next firmware to be applied to the 1-system is not the final update destination version.

(S33) The firmware update unit 170 applies the intermediate firmware to the 1-system. More specifically, the firmware update unit 170 refers to the intermediate firmware table 154 so as to acquire a record having the smallest value for the application order among records whose application flag is "false". The firmware update unit 170 acquires a module-specific firmware program registered in the acquired record, and outputs the module-specific firmware program to the controller module 120. The firmware acquisition unit 160a acquires the module-specific firmware program, and stores the module-specific firmware program in the storage unit 150a. The firmware update unit 170 instructs the firmware update unit 170a to apply the intermediate firmware of the provided version. The firmware update unit 170a refers to the storage unit 150a so as to apply the intermediate firmware to the controller module 120 (which involves restarting the controller module 120). The firmware update unit 170a notifies the firmware update unit 170 of the completion of application. The firmware update unit 170 changes the setting of the application flag of the record in the intermediate firmware table 154 corresponding to the applied intermediate firmware from "false" to "true".

(S34) The firmware update unit 170 refers to the intermediate firmware table 154 so as to determine whether the version of the next firmware to be applied to the 0-system is the final update destination version. If the version of the next firmware is not the final update destination version, the process proceeds to step S35. If the version of the next firmware is the final update destination version, the process proceeds to step S38. The determination method used here is the same as that used in step S32.

(S35) The firmware update unit 170 applies the intermediate firmware to the 0-system. More specifically, the firmware update unit 170 refers to the intermediate firmware table 154 so as to acquire a record having the smallest value for the application order among records whose application flag is "false". The firmware update unit 170 acquires a module-specific firmware program registered in the record, and applies the module-specific firmware program to the controller module 110 (which involves restarting the controller module 110). When the application completes, the firmware update unit 170 changes the setting of the application flag of the record in the intermediate firmware table 154 corresponding to the applied intermediate firmware from "false" to "true". Then, the process returns to step S32.

(S36) The firmware update unit 170 applies the firmware of the final update destination version to the 1-system. More specifically, the firmware update unit 170 acquires the program of the firmware of the final update destination version from the storage unit 150, outputs the program to the controller module 120, and issues an instruction to start active replacement of firmware. Then, the firmware update unit 170a applies the firmware of the final update destination version to the controller module 120 (which involves restarting the controller module 120). The firmware update unit 170a notifies the firmware update unit 170 of the completion of application.

(S37) Having been notified of the completion of application by the firmware update unit 170a, the firmware update unit 170 applies the firmware of the final update destination version to the 0-system as well. More specifically, the firmware update unit 170 acquires the program of the firmware of the final update destination version from the storage unit 150, and applies the program to the controller module 110 (which involves restarting the controller module 110). Then, the process ends.

(S38) The firmware update unit 170 applies the firmware of the final update destination version to the 0-system. The details of the application method are the same as those in step S37.

(S39) The firmware update unit 170 applies the firmware of the final update destination version to the 1-system as well. The details of the application method are the same as those in step S36. Then, the process ends.

In this manner, the firmware update units 170 and 170a apply firmware of a different version alternately to one of the systems while maintaining the compatibility of firmware between the two systems.

Figure 13:
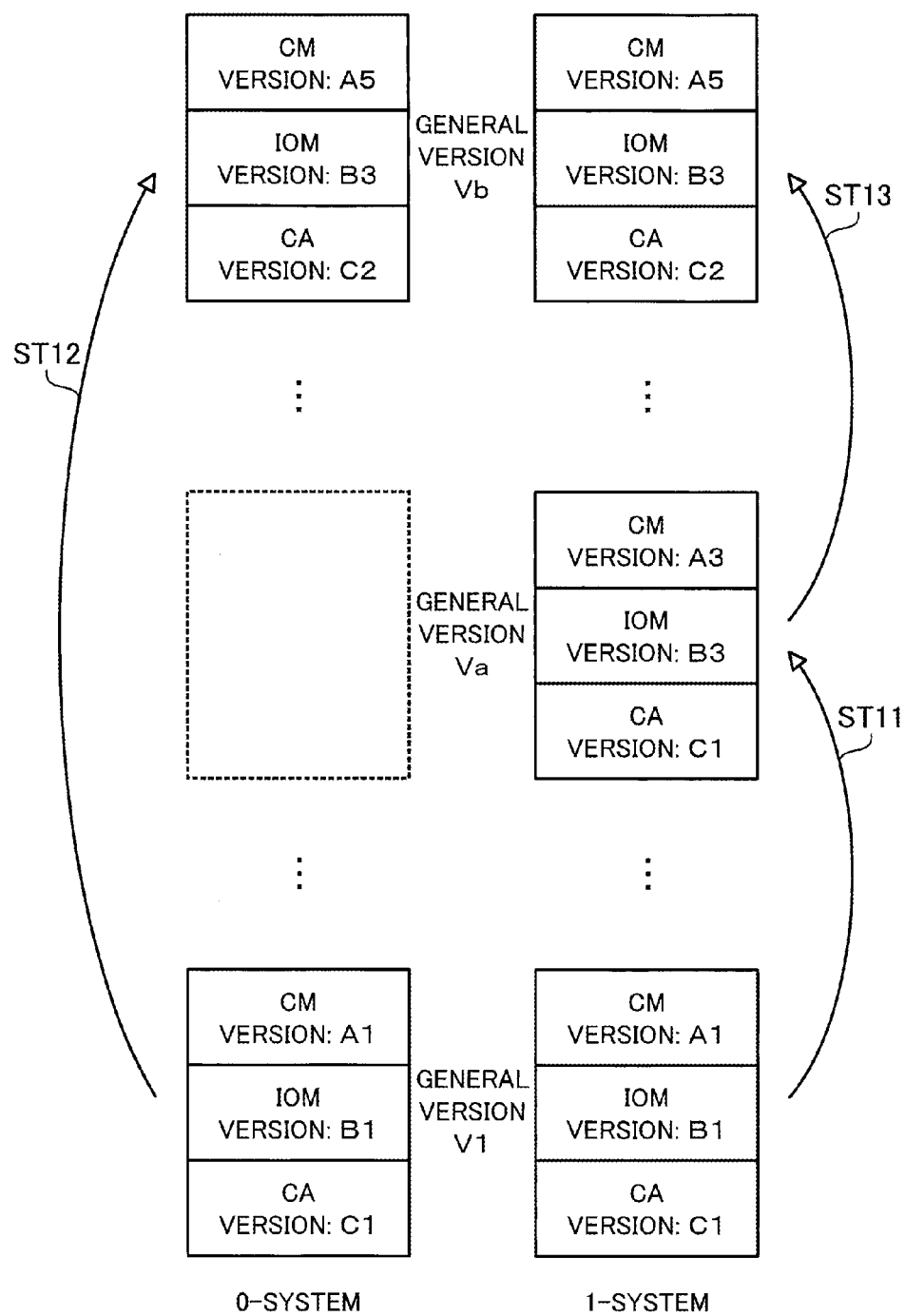
FIG. 13 illustrates a first example of firmware update according to the second embodiment.

FIG. 13 illustrates a first example of firmware update according to the second embodiment. FIG. 13 illustrates the case in which the version (general version) of the firmware currently running on the two systems is V1 and the final update destination version is Vb. In this case, according to the procedure of FIG. 11, the firmware acquisition unit 160 downloads, as intermediate firmware, information corresponding to the version Va illustrated in FIG. 10 from the firmware distribution server 400, and stores the information in the intermediate firmware table 154. Further, the firmware acquisition unit 160 also downloads information corresponding to the final update destination version Vb from the firmware distribution server 400, and stores the information in the storage unit 150.

In this step, the firmware acquisition unit 160 downloads, as the information on the version Va, only the module-specific firmware programs of "A3" and "B3" which are the differences between the versions V1 and Va. The module-specific firmware program corresponding to "C1" is included in the firmware of the version V1, and has already been applied. Therefore, this program does not need to be downloaded.

Further, the firmware acquisition unit 160 downloads, as the information on the version Vb, only the module-specific firmware programs of "A5" and "C2" which are the differences between the versions Va and Vb. The module-specific firmware program corresponding to "B3" is included in the firmware of the version Va, and therefore does not need to be downloaded. Then, the firmware update unit 170 updates the firmware of the two systems in the following manner.

First, the firmware update unit 170 instructs the firmware update unit 170a to apply the intermediate firmware of the version Va. The firmware update unit 170a applies the intermediate firmware of the version Va to the controller module 120 (step ST11). In this step, the firmware update unit 170a only needs to replace with the module-specific firmware programs corresponding to the differences "A3" and "B3" from the version V1. This is because there is no update to the module-specific firmware program corresponding to "C1".

As illustrated in FIGS. 9A and 9B, the firmware of the versions V1 and the firmware of the version Va are compatible with each other. Accordingly, even when the firmware of the version V1 runs on the 0-system and the firmware of the version Va runs on the 1-system, the two systems are able to appropriately cooperate with each other.

Subsequently, the firmware update unit 170 applies the firmware of the final update destination version Vb to the controller module 110 (step ST12). In this step, the firmware update unit 170 may acquire the module-specific firmware program corresponding to "B3" included in the module-specific firmware programs corresponding to the version Vb from the record of the general version Va in the intermediate firmware table 154.

As illustrated in FIGS. 9A and 9B, firmware of the versions Va and the firmware of the version Vb are compatible with each other. Accordingly, even when the firmware of the version Vb runs on the 0-system and the firmware of the version Va runs on the 1-system, the two systems are able to appropriately cooperate with each other.

Subsequently, the firmware update unit 170 instructs the firmware update unit 170a to apply the firmware of the version Vb. The firmware update unit 170a applies the firmware of the version Vb to the controller module 120 (step ST13). In this step, the firmware update unit 170a only needs to replace with the module-specific firmware programs corresponding to the differences "A5" and "C2" from the version Va. This is because there is no update to the module-specific firmware program corresponding to "B3".

Thus, application of the firmware of the version Vb to both the 0-system and 1-system completes.

Figure 14:
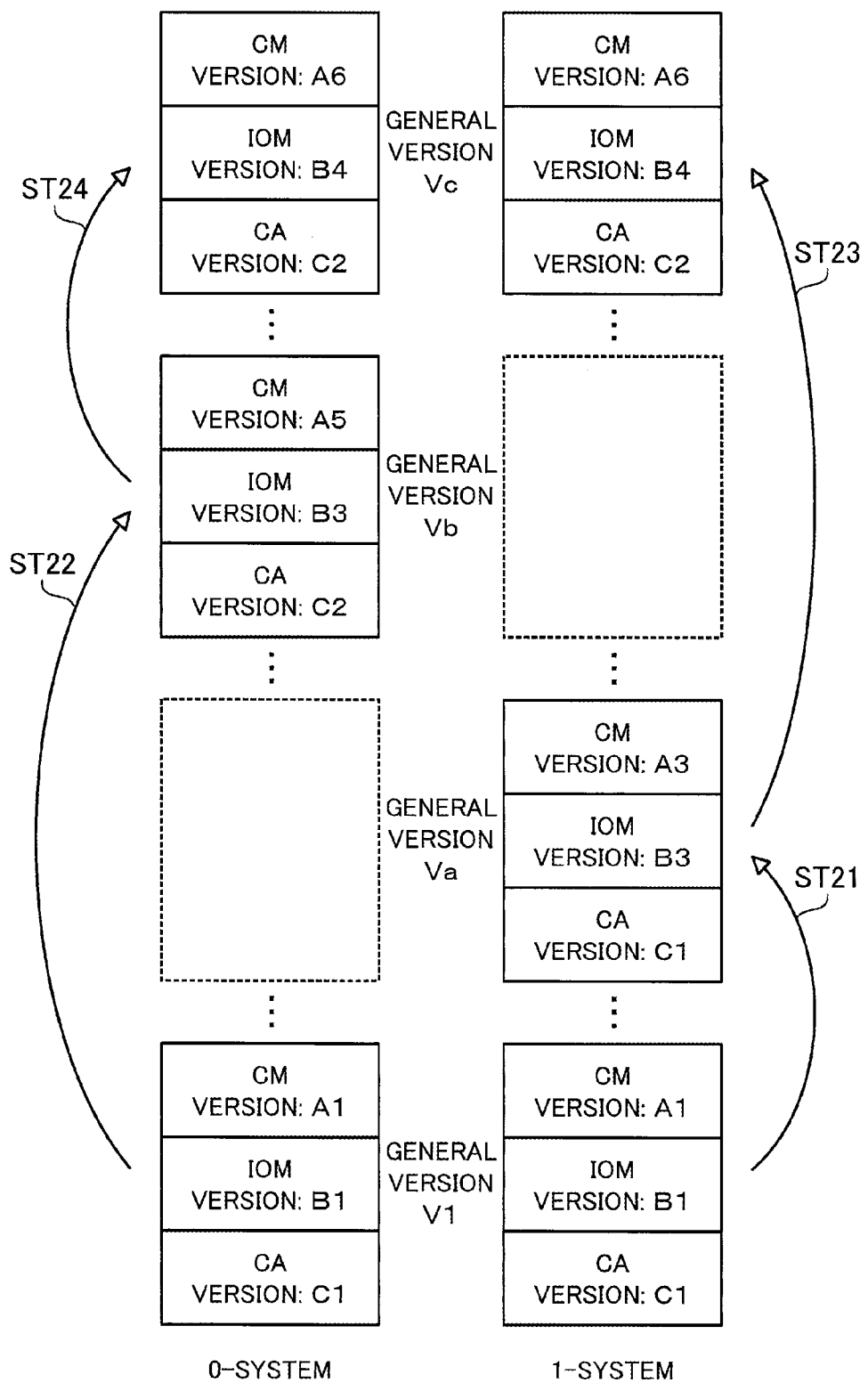
FIG. 14 illustrates a second example of firmware update according to the second embodiment.

FIG. 14 illustrates a second example of firmware update according to the second embodiment. FIG. 14 illustrates the case in which the version (general version) of the firmware currently running on the two systems is V1 and the final update destination version is Vc. It is supposed that the firmware of the version Vb and the firmware of the version Vc are compatible with each other. In this case, according to the procedure of FIG. 11, the firmware acquisition unit 160 stores, as intermediate firmware, records of the versions Va and Vb in the intermediate firmware table 154. Further, the firmware acquisition unit 160 also downloads information corresponding to the final update destination version Vc from the firmware distribution server 400, and stores the information in the storage unit 150.

In this step, the firmware acquisition unit 160 downloads, as the information on the version Va, only the module-specific firmware programs of "A3" and "B3" which are the differences between the versions V1 and Va. The module-specific firmware program corresponding to "C1" is included in the firmware of the version V1, and has already been applied. Therefore, this program does not need to be downloaded.

Further, the firmware acquisition unit 160 downloads, as the information on the version Vb, only the module-specific firmware programs of "A5" and "C2" which are the differences between the versions Va and Vb. The module-specific firmware program corresponding to "B3" is included in the firmware of the version Va, and therefore does not need to be downloaded.

Similarly, the firmware acquisition unit 160 downloads, as the information on the version Vc, only the module-specific firmware programs of "A6" and "B4" which are the differences between the versions Vb and Vc. The module-specific firmware program corresponding to "C2" is included in the firmware of the version Vb, and therefore does not need to be downloaded. Then, the firmware update unit 170 updates the firmware of the two systems in the following manner.

First, the firmware update unit 170 instructs the firmware update unit 170a to apply the intermediate firmware of the version Va. The firmware update unit 170a applies the intermediate firmware of the version Va to the controller module 120 (step ST21). In this step, the firmware update unit 170a only needs to replace with the module-specific firmware programs corresponding to the differences "A3" and "B3" from the version V1. This is because there is no update to the module-specific firmware program corresponding to "C1".

As illustrated in FIGS. 9A and 9B, the firmware of the versions V1 and the firmware of the version Va are compatible with each other. Accordingly, even when the firmware of the version V1 runs on the 0-system and the firmware of the version Va runs on the 1-system, the two systems are able to appropriately cooperate with each other.

Subsequently, the firmware update unit 170 applies the intermediate firmware of the version Vb to the controller module 110 (step ST22). In this step, the firmware update unit 170 may acquire the module-specific firmware program corresponding to "B3" included in the module-specific firmware programs corresponding to the version Vb from the record of the general version Va in the intermediate firmware table 154.

As illustrated in FIGS. 9A and 9B, firmware of the versions Va and the firmware of the version Vb are compatible with each other. Accordingly, even when the firmware of the version Vb runs on the 0-system and the firmware of the version Va runs on the 1-system, the two systems are able to appropriately cooperate with each other.

Subsequently, the firmware update unit 170 instructs the firmware update unit 170a to apply the firmware of the final update destination version Vc. In this step, the firmware update unit 170 may acquire the module-specific firmware program corresponding to "C2" included in the module-specific firmware programs corresponding to the version Vc from the record of the general version Vb in the intermediate firmware table 154. The firmware update unit 170a applies the intermediate firmware of the version Vc to the controller module 120 (step ST23).

The firmware of the version Vb and the firmware of the version Vc are compatible with each other. Accordingly, even when the firmware of the version Vb runs on the 0-system and the firmware of the version Vc runs on the 1-system, the two systems are able to appropriately cooperate with each other.

Subsequently, the firmware update unit 170 applies the firmware of the version Vc to the controller module 110 (step ST24). In this step, the firmware update unit 170 only needs to replace with the module-specific firmware programs corresponding to the differences "A6" and "B4" from the version Vb. This is because there is no update to the module-specific firmware program corresponding to "C2".

Thus, application of the firmware of the version Vc to both the 0-system and 1-system completes. According to the storage apparatus 100 of the second embodiment, it is possible to increase the speed of updating firmware.

There may be a method that sequentially updates the firmware of the two systems one generation by one generation, for example. This method is possible because the compatibility of firmware is usually maintained if the difference in version is one generation. More specifically, in the case of updating firmware from the version (general version) V1 to the version Vb, the firmware of the version V2 is first applied to the 1-system, and then the firmware of the version V2 is applied to the 0-system. Subsequently, the firmware of a version V3 is applied to the 1-system, and then the firmware of the version V3 is applied to the 0-system. By repeating this process, the firmware of the two systems is updated one generation by one generation. However, this method might increase the number of steps of the firmware update procedure. As the number of steps of the firmware update procedure increases, the risk of the firmware update failing increases.

In view of this, the storage apparatus 100 applies, alternately to one of the systems, firmware of a version which is compatible with that applied to the counterpart system and is more recent than that applied to the counterpart system. This makes it possible to reduce the number of steps of the firmware update procedure.

In particular, according to the method used by the storage apparatus 100, a version that is compatible with a version applied to the counterpart system and that is the most recent among a plurality of versions more recent than the version applied to the counterpart system is selected. Therefore, for example, it is possible to eliminate the need to apply firmware corresponding to other versions (version V2 and so on) existing between the version V1 and the version Va. This further reduces the number of steps of the firmware update procedure.

Further, only module-specific firmware programs which have not been acquired are acquired for each general version. This eliminates the need to repeatedly download a module-specific firmware program corresponding to a plurality of general versions.

In the second embodiment, three types of firmware, namely, the controller modules 110 and 120, the input and output modules 130 and 140, and the channel adapters 114, 115, 124, and 125 are illustrated as module-specific firmware. However, there may be other types of firmware. For example, Basic Input/Output System (BIOS) used in the controller modules 110 and 120 and firmware of the expanders 117 and 127 may also be regarded as module-specific firmware.

The method of the second embodiment is also applicable to the case in which firmware includes two types or four or more types of module-specific firmware (sub firmware). For example, if a single piece of firmware includes N (N is an integer greater than or equal to 2) types of module-specific firmware, the sum of the compatibility indexes of the respective N types of module-specific firmware is the total compatibility index of the firmware.

Further, for security purposes, access from the storage apparatus 100 to the network 50 is often restricted. In this case, it is difficult to download firmware to the storage apparatus 100 directly from the firmware distribution server 400. Thus, the storage apparatus 100 may report the general version of intermediate firmware and the general version of the final update destination to the management server 200 such that the management server 200 downloads the firmware from the firmware distribution server 400, in place of the storage apparatus 100.

(c) Third Embodiment

Hereinafter, a third embodiment will be described. The following discussion is focused on the differences from the second embodiment, and a description of the same features as those described above will be omitted.

In the second embodiment, the firmware acquisition units 160 and 160a are provided in the controller modules 110 and 120, respectively. However, another functional arrangement is possible. The third embodiment provides a method that controls acquisition of firmware and update of firmware using the management server 200.

An information processing system of the third embodiment is the same as the information processing system of the second embodiment illustrated in FIG. 2. Further, the apparatuses and the hardware of the apparatuses of the third embodiment are the same as the apparatuses and the example of the hardware of the apparatuses of the second embodiment illustrated in FIGS. 3, 4, and 5. Thus, in the third embodiment, elements of the apparatuses, functional modules, and so on are denoted by the same names and the same reference numerals as those in the second embodiment.

In the third embodiment, the function of acquiring firmware from the firmware distribution server 400 and the function of applying firmware to the controller modules 110 and 120 are provided by the management server 200. That is, the third embodiment is different from the second embodiment in that a part of the functions provided by the storage apparatus 100 in the second embodiment are provided by the management server 200 instead of the storage apparatus 100.

Figure 15:
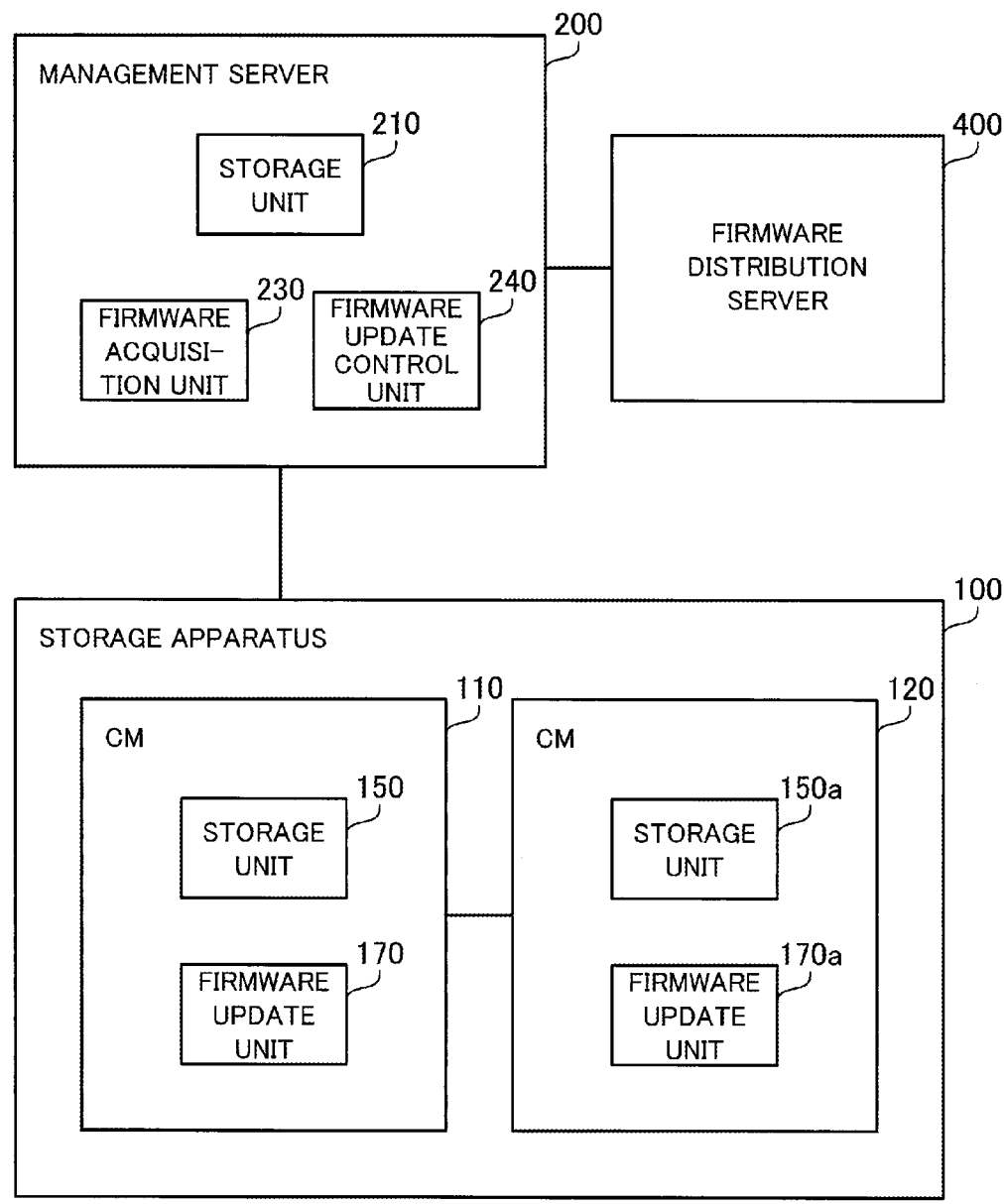
FIG. 15 illustrates an example of functions according to a third embodiment.

FIG. 15 illustrates an example of functions according to the third embodiment. The management server 200 includes a storage unit 210, a firmware acquisition unit 230, and a firmware update control unit 240. The functions of the management server 200 may be realized when the processor 201 executes a program stored in the RAM 202.

The storage unit 210 may be realized as a storage space reserved in the RAM 202 or the HDD 203. The storage unit 210 stores, in place of the storage units 150 and 150a, a firmware compatibility table 151, a compatibility index table 152, active replacement executability threshold information 153, and an intermediate firmware table 154.

The firmware acquisition unit 230 downloads firmware from the firmware distribution server 400, and stores the firmware in the storage unit 210. The firmware acquisition unit 230 may download firmware from the firmware distribution server 400 at the timing specified by the user, or when a notification indicating that the distribution of new firmware has started is received from the firmware distribution server 400.

The firmware acquisition unit 230 acquires intermediate firmware and firmware of the final update destination version from the firmware distribution server 400, using the same procedure as that used by the firmware acquisition unit 160 (or the firmware acquisition unit 160a) in the flowchart of FIG. 11. That is, the processing performed by the firmware acquisition unit 160 in the procedure illustrated in FIG. 11 is performed by the firmware acquisition unit 230. The firmware acquisition unit 230 is able to perform the same processing as that performed by the firmware acquisition unit 160, by referring to information stored in the storage unit 210 and by storing newly acquired information (the intermediate firmware table 154 and so on) in the storage unit 210.

After the new firmware is acquired by the firmware acquisition unit 230, the firmware update control unit 240 applies the acquired firmware to the controller modules 110 and 120. The firmware update control unit 240 may refer to the information stored in the storage unit 210 and apply the intermediate firmware and the firmware of the final update destination version to the controller modules 110 and 120, using the same procedure as that used by the firmware update unit 170 (or the firmware update unit 170a) in the flowchart of FIG. 12. That is, the processing performed by the firmware update unit 170 in the procedure illustrated in FIG. 12 is performed by the firmware update control unit 240. However, in the case of applying firmware to the controller module 110, the firmware update control unit 240 provides the firmware update unit 170 with firmware to be applied, and issues an instruction to apply the firmware.

The controller module 110 includes the storage unit 150 and the firmware update unit 170. The controller module 120 includes the storage unit 150a and the firmware update unit 170a. The storage units 150 and 150a store a program of firmware acquired from the firmware update control unit 240. The firmware update unit 170 updates firmware executed on the controller module 110, in accordance with an instruction from the firmware update control unit 240. The firmware update unit 170a updates firmware executed on the controller module 120, in accordance with an instruction from the firmware update control unit 240.

In this way, the management server 200 may store information on the compatibility between different versions of firmware used for controlling the redundant controller modules 110 and 120 provided in the storage apparatus 100, using the storage unit 210. Upon updating firmware of both the controller modules 110 and 120 from a first version to a second version incompatible with the first version, the management server 200 refers to the information stored in the storage unit 210 and applies, alternately to one of the controller modules 110 and 120, firmware of a version that is one of versions from the first version to the second version, that is compatible with firmware of a version currently applied to the counterpart module, and that is more recent than the version currently applied to the counterpart module. The management server 200 of the third embodiment may be regarded as an example of the firmware update apparatus 10 of the first embodiment.

According to the third embodiment, even if the storage apparatus 100 is not able to download firmware directly from the firmware distribution server 400, it is possible to update firmware by acquiring firmware through the management server 200.

(d) Fourth Embodiment

Hereinafter, a fourth embodiment will be described. The following discussion is focused on the differences from the second and third embodiments, and a description of the same features as those described above will be omitted.

An information processing system of the fourth embodiment is the same as the information processing system of the second embodiment illustrated in FIG. 2. Further, the apparatuses and the hardware of the apparatuses of the fourth embodiment are the same as the apparatuses and the example of the hardware of the apparatuses of the second embodiment illustrated in FIGS. 3, 4, and 5. Thus, in the fourth embodiment, elements of the apparatuses, functional modules, and so on are denoted by the same names and the same reference numerals as those in the second embodiment.

However, the storage apparatus 100 of the fourth embodiment includes a management module, as a management unit that manages the controller modules 110 and 120. The management module includes a processor used for management processing, a RAM, a flash memory, and a communication interface capable of connecting to the network 30.

In the fourth embodiment, the function of acquiring firmware from the firmware distribution server 400 and the function of applying firmware to the controller modules 110 and 120 are provided by the management module. That is, the fourth embodiment is different from the second embodiment in that a part of the functions provided by the controller modules 110 and 120 in the second embodiment are provided by the management module instead of the controller modules 110 and 120.

Figure 16:
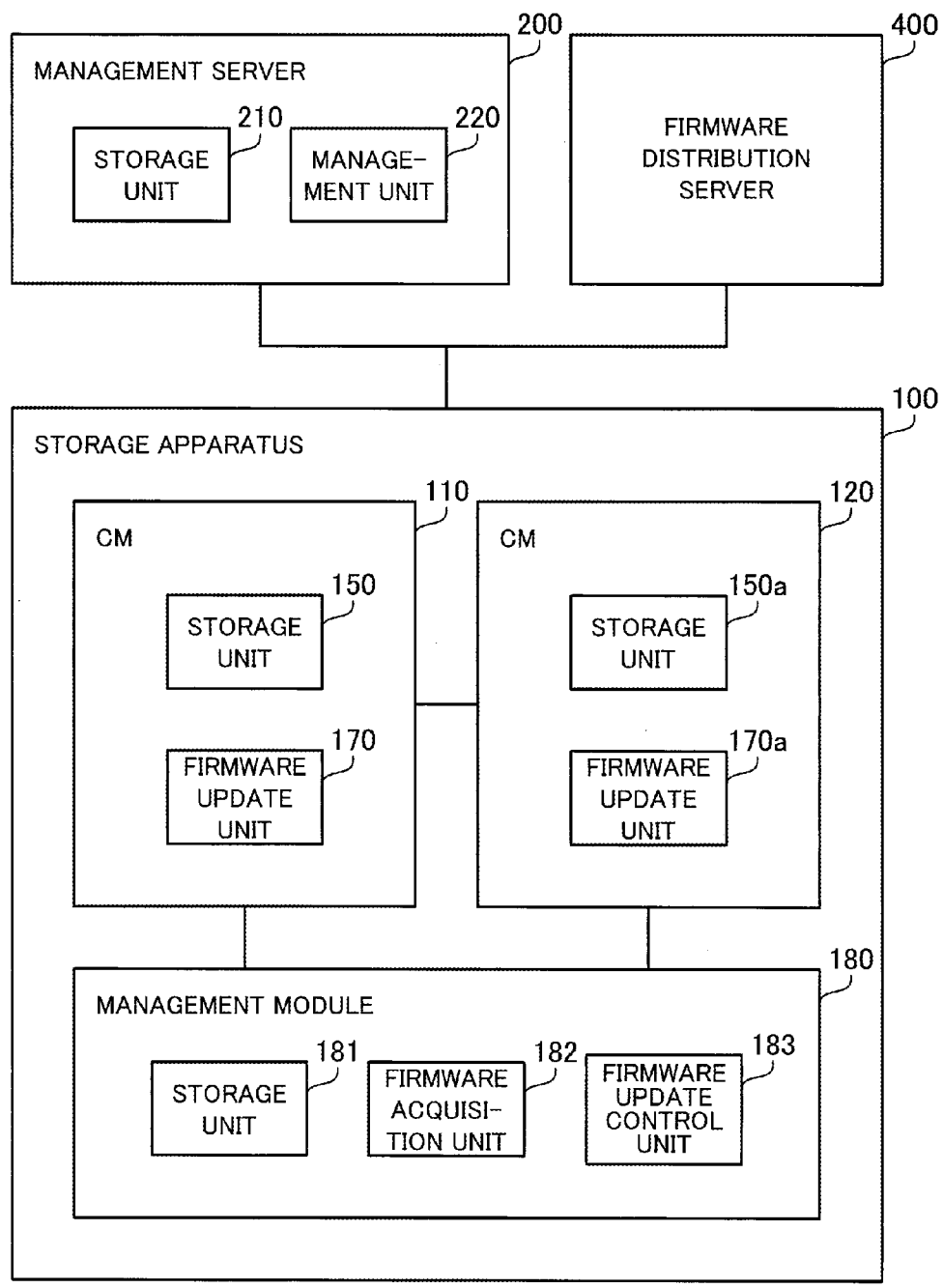
FIG. 16 illustrates an example of functions according to a fourth embodiment.

FIG. 16 illustrates an example of functions according to the fourth embodiment. A management module 180 includes a storage unit 181, a firmware acquisition unit 182, and a firmware update control unit 183. The functions of the management module 180 may be realized when a processor provided in the management module 180 executes a program that is stored in a RAM provided in the management module 180.

The storage unit 181 may be realized as a storage space reserved in the RAM or a flash memory provided in the management module 180. The storage unit 181 stores, in place of the storage units 150 and 150a, a firmware compatibility table 151, a compatibility index table 152, active replacement executability threshold information 153, and an intermediate firmware table 154.

The firmware acquisition unit 182 downloads firmware from the firmware distribution server 400, and stores the firmware in the storage unit 181. The firmware acquisition unit 182 may download firmware from the firmware distribution server 400 at the timing specified by the user, or when a notification indicating that the distribution of new firmware has started is received from the firmware distribution server 400.

The firmware acquisition unit 182 acquires intermediate firmware and firmware of the final update destination version from the firmware distribution server 400, using the same procedure as that used by the firmware acquisition unit 160 (or the firmware acquisition unit 160a) in the flowchart of FIG. 11. That is, the processing performed by the firmware acquisition unit 160 in the procedure illustrated in FIG. 11 is performed by the firmware acquisition unit 182. The firmware acquisition unit 182 is able to perform the same processing as that performed by the firmware acquisition unit 160, by referring to information stored in the storage unit 181 and by storing newly acquired information (the intermediate firmware table 154 and so on) in the storage unit 181.

After the new firmware is acquired by the firmware acquisition unit 182, the firmware update control unit 183 applies the acquired firmware to the controller modules 110 and 120. The firmware update control unit 183 may refer to the information stored in the storage unit 181 and apply the intermediate firmware and the firmware of the final update destination version to the controller modules 110 and 120, using the same procedure as that used by the firmware update unit 170 (or the firmware update unit 170a) in the flowchart of FIG. 12. That is, the processing performed by the firmware update unit 170 in the procedure illustrated in FIG. 12 is performed by the firmware update control unit 183. However, in the case of applying firmware to the controller module 110, the firmware update control unit 183 provides the firmware update unit 170 with firmware to be applied, and issues an instruction to apply the firmware.

The controller module 110 includes the storage unit 150 and the firmware update unit 170. The controller module 120 includes the storage unit 150a and the firmware update unit 170a. The storage units 150 and 150a store a program of firmware acquired from the firmware update control unit 183. The firmware update unit 170 updates firmware executed on the controller module 110, in accordance with an instruction from the firmware update control unit 183. The firmware update unit 170a updates firmware executed on the controller module 120, in accordance with an instruction from the firmware update control unit 183.

In this way, the management module 180 may store information on the compatibility between different versions of firmware used for controlling the redundant controller modules 110 and 120 provided in the storage apparatus 100, using the storage unit 181. Upon updating firmware of both the controller modules 110 and 120 from a first version to a second version incompatible with the first version, the management module 180 refers to the information stored in the storage unit 181 so as to apply, alternately to one of the controller modules 110 and 120, firmware of a version that is one of versions from the first version to the second version, that is compatible with firmware of a version currently applied to the counterpart module, and that is more recent than the version currently applied to the counterpart module. The management module 180 may be regarded as an example of the firmware update apparatus 10 of the first embodiment.

In this way, by providing the management module 180 separately from the controller modules 110 and 120, the resource usage of the processors 111 and 121, the RAMs 112 and 122, and the flash memories 113 and 123 may be reduced.

Note that information processing of the first embodiment may be realized by causing the computing unit 12 to execute a program. The information processing of the second embodiment may be realized by causing the processors 111 and 121 to execute a program. The information processing of the third embodiment may be realized by causing the processor 201 to execute a program. The information processing of the forth embodiment may be realized by causing the processor provided in the management module 180 to execute a program. Such a program may be recorded in a computer-readable storage medium (for example, an optical disc, a memory card, and so on presented as examples of the storage medium 33).

For example, the program may be stored in a storage medium and distributed. Further, the program may be stored in another computer and distributed via a network. The computer may store (install) the program recorded in the recording medium or the program received from the other computer in its storage device such as a RAM, a flash memory, an HDD, and so on, and may read and execute the program from the storage device.

According to one aspect, it is possible to increase the speed of updating firmware.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A firmware update apparatus comprising:
a memory that stores information on compatibility between different versions of firmware used for controlling two redundant controllers provided in a storage apparatus; and
a processor that performs a procedure including:
updating, with reference to the information stored in the memory, the firmware of each of the two controllers from a first version to a second version by alternately updating the firmware of one of the controllers and the firmware of another of the controllers, the second version being incompatible with and more recent than the first version; and
selecting, for the one of the controllers, the firmware of a version that is one of versions from the first version to the second version, that is compatible with the firmware of the version currently applied to said another of the controllers, and that is most recent among a plurality of versions more recent than the version currently applied to said another of the controllers; and
updating the firmware of the one of the controllers to the firmware of the version selected;
wherein the firmware of the one of the controllers is updated to a third version that is compatible with and more recent than a current version of the firmware of said another of the controllers; and
wherein the firmware of said another of the controllers is updated to a fourth version that is compatible with and more recent than a current version of the firmware of the one of the controllers.

2. The firmware update apparatus according to claim 1, wherein:
firmware of each of the versions is a combination of a plurality of programs, and a version is assigned in accordance with an update to any of the programs; and
the procedure further includes acquiring, from another apparatus, a program included in firmware of a version that is to be applied and not included in firmware of versions already acquired from said another apparatus, and applying the firmware of the version that is to be applied to the one of the controllers.

3. The firmware update apparatus according to claim 1, wherein the procedure further includes, after applying firmware of the second version to one of the controllers, applying the firmware of the second version to said another of the controllers.

4. The firmware update apparatus according to claim 1, wherein the information indicates that there is compatibility when the updating without suspending data access to the storage apparatus is possible, and indicates that there is no compatibility when the updating without suspending the data access is not possible.

5. A storage control apparatus comprising:
a memory that stores information on compatibility between different versions of firmware used for controlling two redundant controllers provided in a storage apparatus; and
a processor that performs a procedure including:
updating, with reference to the information stored in the memory, the firmware of each of the two controllers from a first version to a second version by alternately updating the firmware of one of the controllers and the firmware of another of the controllers, the second version being incompatible with and more recent than the first version; and
selecting, for the one of the controllers, the firmware of a version that is one of versions from the first version to the second version, that is compatible with the firmware of the version currently applied to said another of the controllers, and that is most recent among a plurality of versions more recent than the version currently applied to said another of the controllers; and
updating the firmware of the one of the controllers to the firmware of the version selected;
wherein the firmware of the one of the controllers is updated to a third version that is compatible with and more recent than a current version of the firmware of said another of the controllers; and
wherein the firmware of said another of the controllers is updated to a fourth version that is compatible with and more recent than a current version of the firmware of the one of the controllers.

6. A non-transitory computer-readable storage medium storing a computer program that causes a computer to perform a procedure comprising:
updating, with reference to information on compatibility between different versions of firmware used for controlling two redundant controllers provided in a storage apparatus, the firmware of each of the two controllers from a first version to a second version by alternately updating the firmware of one of the controllers and the firmware of another of the controllers, the second version being incompatible with and more recent than the first version; and
selecting, for the one of the controllers, the firmware of a version that is one of versions from the first version to the second version, that is compatible with the firmware of the version currently applied to said another of the controllers, and that is most recent among a plurality of versions more recent than the version currently applied to said another of the controllers; and
updating the firmware of the one of the controllers to the firmware of the version selected;
wherein the firmware of the one of the controllers is updated to a third version that is compatible with and more recent than a current version of the firmware of said another of the controllers; and
wherein the firmware of said another of the controllers is updated to a fourth version that is compatible with and more recent than a current version of the firmware of the one of the controllers.

* * * * *